(12) United States Patent
Lee et al.

(10) Patent No.: US 8,510,655 B2
(45) Date of Patent: Aug. 13, 2013

(54) METHOD AND SYSTEM FOR OPERATING APPLICATION OF A TOUCH DEVICE WITH TOUCH-BASED INPUT INTERFACE

(75) Inventors: Bong Won Lee, Seoul (KR); Il Haeng Cho, Seoul (KR); Dong Seok Ryu, Seoul (KR); Sung Ho Park, Gyeonggi-do (KR); Sang Ki Lee, Seoul (KR); Kyu Sung Kim, Gyeonggi-do (KR); Min Seung Song, Seoul (KR); Joo Yeon Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 257 days.

(21) Appl. No.: 12/977,270

(22) Filed: Dec. 23, 2010

(65) Prior Publication Data

US 2011/0225539 A1   Sep. 15, 2011

Related U.S. Application Data

(60) Provisional application No. 61/284,865, filed on Dec. 24, 2009.

(30) Foreign Application Priority Data

Sep. 20, 2010   (KR) .................. 10-2010-0092291

(51) Int. Cl.
*G06F 13/00* (2006.01)
*G06F 15/00* (2006.01)

(52) U.S. Cl.
USPC ........................ 715/723; 715/732; 715/761

(58) Field of Classification Search
USPC ................ 715/835, 740, 851–853, 761–765, 715/723, 730–733
See application file for complete search history.

(56) References Cited

U.S. PATENT DOCUMENTS

| | | | |
|---|---|---|---|
| 2006/0256084 | A1 | 11/2006 | Hey et al. |
| 2008/0186385 | A1 | 8/2008 | O |
| 2009/0265628 | A1 | 10/2009 | Bamford et al. |
| 2010/0070899 | A1* | 3/2010 | Hunt et al. ............ 715/769 |
| 2010/0162171 | A1* | 6/2010 | Felt et al. ............ 715/835 |

FOREIGN PATENT DOCUMENTS

| | | |
|---|---|---|
| EP | 1 739 533 | 1/2007 |
| EP | 2 151 978 | 2/2010 |
| KR | 10-2006-0133389 A | 12/2006 |
| KR | 10-2008-0076412 A | 8/2008 |
| KR | 10-2009-0035332 A | 4/2009 |
| WO | WO 03/094144 | 11/2003 |

* cited by examiner

*Primary Examiner* — Cao "Kevin" Nguyen
(74) *Attorney, Agent, or Firm* — Cha & Reiter, LLC

(57) ABSTRACT

A method and system is disclosed that allows a user to easily and intuitively operate applications that require contact information, in a touch device, via a tray item associated with the contact information. The method for operating applications includes: displaying a contact tray comprised of a number of tray items based on contact information, on an execution screen; receiving an interaction to use a tray item in the contact tray; configuring an execution screen for an application based on contact information of the tray item; and operating the application based on the configured execution screen.

20 Claims, 16 Drawing Sheets

METHOD AND SYSTEM FOR OPERATING APPLICATION OF A TOUCH DEVICE WITH TOUCH-BASED INPUT INTERFACE

CLAIM OF PRIORITY

This applicant claims the benefit of the earlier filing date, pursuant to 35 USC 119, of that provisional patent application entitled "Method and System for Operating Application of a Touch Device with Touch-Based Input Interface," filed in the US Patent Office on Dec. 24, 2009 and afforded Ser. No. 61/284,865, and of that patent application entitled, "Method and System for Operating Application of a Touch Device with Touch-Based Input Interface," filed in the Korean Patent Office on Sep. 20, 2010 and afforded serial number 102010-0092291, the entire contents of both of which are incorporated by reference, herein.

BACKGROUND OF THE INVENTION

1. Field of the Invention

This invention relates to touch systems, and more particularly, to a method and system that allows for easy access to functions and applications that require contact information, in a touch device with a touch-based input interface, via a tray item cooperated with the contact information.

2. Description of the Related Art

In recent years, with the high advance of information communication technology and semiconductor technology, various types of mobile devices have been developed that lead to an increase in the number of different functions and uses. Conventional mobile devices have experienced convergence of utility where the original mobile device function can be combined with services of other electronic devices. For example, conventional mobile communication terminals have various multimedia functions, as well as general communication functions such as voice call, message transmission/reception, etc. Examples of multimedia functions are a television view function (e.g., mobile broadcasts such as digital multimedia broadcast (DMB), digital video broadcast (DVB), etc.), music playback function (e.g., MPEG Audio-Layer 3 (MP3)), a photographing function, an Internet service function, a dictionary browsing function, etc.

In addition, the number of mobile devices that are equipped with a touch device with a touch screen has increased significantly. The touch device can operate as both a display unit for displaying operational states of a mobile device and an input unit for receiving data, etc. Touch devices are generally implemented with a full touch screen. Users can use or control touch devices via a touch-based input interface.

Users have been gradually concerned about the designs of the touch devices and the user interface (UI). It is important to implement a user interface environment so that users can easily use the functions of the touch devices. To this end, various attempts are being made to allow for easier convenience when using touch devices' new functions.

SUMMARY OF THE INVENTION

The invention has been made in view of the above problems, and provides technology to provide additional function for user's convenience to touch devices.

The invention provides a touch device that can display a contact tray containing contact information-based tray items on an application execution screen, and a method for controlling the touch device.

The invention further provides an implementation of an interface environment where various applications and function requiring contact information can be easily managed via tray items in a contact tray.

The invention further provides an enhancement of the use and convenience of a touch device by implementing an environment to perform applications/functions cooperating with contact information in a touch device.

In accordance with an exemplary embodiment of the invention, the invention provides a method for operating applications of a touch device, including: displaying a contact tray comprised of a number of tray items based on contact information, on an execution screen; receiving an interaction to use a tray item in the contact tray; configuring an execution screen for an application based on contact information of the tray item; and operating the application based on the configured execution screen.

In one aspect, the method may be implemented with programs that can execute the processes, which are stored in a computer-readable recording media.

In accordance with another exemplary embodiment of the invention, the invention provides a touch device including a display unit and a controller. The display unit displays an execution screen for an application and a contact tray including contact information-based tray items on the execution screen. The display unit also receives interactions to use the tray items in the contact tray. The controller configures the execution screen for an application based on contact information about the tray item, according to the input interaction. The controller also operates the application based on the configured execution screen.

In one aspect, the contact tray includes first and second item regions. The first item region contains a tray item, associated with contact information corresponding to a user of the touch device, and is a fixed region where tray items cannot be scrolled. The second item region contains a number tray items, associated with contact information registered by the user, and is a scroll region where tray items can be scrolled according to an input interaction.

BRIEF DESCRIPTION OF THE DRAWINGS

The features and advantages of the invention will become more apparent from the following detailed description in conjunction with the accompanying drawings, in which.

DETAILED DESCRIPTION OF THE INVENTION

Hereinafter, exemplary embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

The invention provides a method and system for operating applications associated with contact information in a touch device with a touch-based input interface. The invention also provides a contact tray containing at least one tray item that is created, based on contact information. The contact tray may appear on all execution screens operated in the touch device. The invention further provides an optimal user interface that allows for easy access to various applications and functions, requiring contact information, via tray items associated with contact information.

The following describes the configuration of a touch device, according to embodiments of the invention and the methods for controlling the touch device in conjunction with the accompanying drawings. It should be understood that the invention is not limited to the embodiments. It will be noted that there may be many modifications from the embodiments and such modifications are considered to be within the scope of the invention as presented in appended claims.

Figure 1:
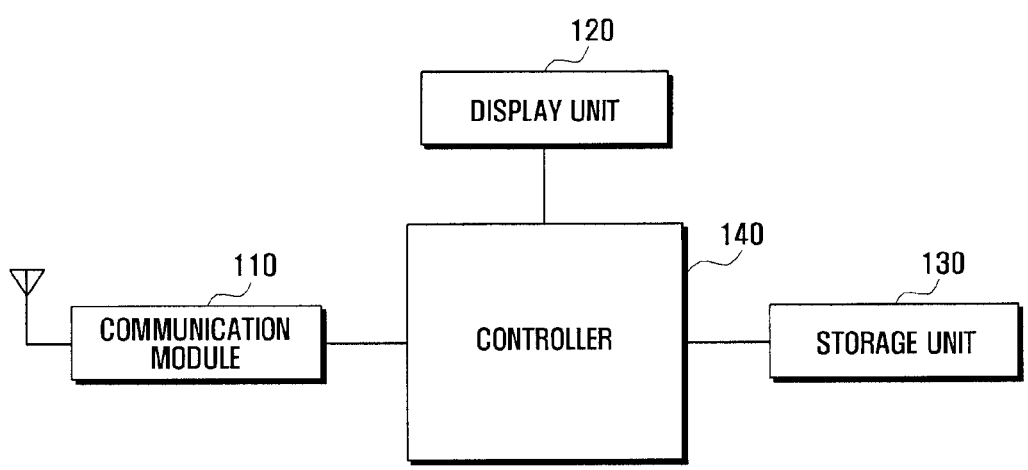
FIG. 1 illustrates a schematic block diagram of a touch device according to an embodiment of the invention.

FIG. 1 illustrates a schematic block diagram of a touch device according to an embodiment of the invention.

Referring to FIG. 1, the touch device includes a communication module 110, a display unit 120, a storage unit 130, and a controller 140. Although it is not shown in FIG. 1, the touch device may also include an audio processing unit including a microphone and a speaker, a digital broadcast module for receiving and reproducing digital broadcasts (e.g., Digital Multimedia Broadcast (DMB), Digital Video Broadcasts (DVB), etc.), a camera module for taking pictures or photographing moving images, a short-range communication module (e.g., Bluetooth) for performing short-range communication, a touch pad for receiving touches; keys allowing for the mechanical key input, etc. Detailed descriptions regarding these additional components are not referred to in the following description to avoid obscuring the invention claimed.

The communication module 110 refers to a module that can support services such as a mobile communication-based service (e.g., cellular communication, short-range communication), a Wireless Local Area Network (WLAN) based Internet service (e.g., Wi-Fi service), etc. The communication module 110 may be implemented with a Radio Frequency (RF) module for performing mobile communication or a WLAN module for performing WLAN-based Internet communication. Although FIG. 1 shows the touch device including one communication module 110, it should be understood that the touch device may include both the RF module and the WLAN module. The touch device can support the mobile communication service and the Internet communication service by communicating with the Internet via the RF module.

The display unit 120 displays a home screen of a touch device and screens when applications of the touch device are executed. Examples of the applications are a messaging function, an e-mail function, an Internet function, a multimedia function, a search function, a communication function, an electronic book function, a taking/photographing of pictures and/or motion pictures function, a playback of pictures/motion pictures function, a TV playback function (e.g., reproducing mobile broadcasts such as DMB, DVB, etc.), an audio playback function (e.g., MP3 playback), a widget function, a memo function, a games function, etc. The display unit 120 may be implemented with a Liquid Crystal Display (LCD), an Organic Light Emitting Diode (OLED), an Active Matrix OLED (AMOLED), or other similar technologies. The display unit 120 can provide a landscape mode or a portrait mode according to the posture of the touch device when displaying an execution screen.

The display unit 120 may include an interface supporting touch-based inputs, i.e., a touch-based input interface. For example, the display unit 120 can be installed to a touch screen and allows for the input of a user's touch-based interaction. In that case, the display unit 120 creates an input signal according to a user's input interaction and transfers the inputted interaction to the controller 140. The display unit 120 can also display a contact tray containing tray items, formed based on the contact information, on an execution screen. The display unit 120 splits and displays the contact tray into three areas, and displays effects controlled according to a user's touch-based interaction on the contact tray. A detailed description about a contact tray displayed on the display unit 120 and screens that are controlled by a user's interaction using the contact tray are provided below.

The storage unit 130 stores data and programs processed or executed in the touch device. The storage unit 130 is implemented with volatile storage media or non-volatile storage, etc. For example, the storage unit 130 can permanently or temporarily store one or more of: an operating system of the touch device, data and programs related to the control of the display unit 120, data and programs related to the input control using the display unit 120, data and programs related to the operation of a contact tray, data and programs related to applications and their operations, where the applications are associated with contact information corresponding to the tray items of a contact tray. For example, the storage unit 130 stores contact information about at least one contact registered in a phone book menu. In addition, the storage unit 130 can also store data and messages that are transmitted or received according to various services. For example, the storage unit 130 can store data and messages associated with a Social Network Service (SNS) (e.g., Twitter, Facebook, etc.), a message service (e.g., SMS, MMS, etc.), an e-mail service, a messenger, and other similar type of services.

The controller 140 controls the entire operation of the touch device. The controller 140 controls the formation of a contact tray, the display of the contact tray, and the operations of the contact tray. For example, the controller 140 can form a contact tray containing tray items that are created based on contact information. The controller 140 can display a contact tray on all the execution screens operated in the touch device, according to a user's interaction, or hide the contact tray overlaid on the execution screen, according to a user's interaction. The controller 140 can operate on contact information, cooperating with applications requiring the contact information, via tray items contained in a contact tray. A detailed description of the controller 140 will be described, later, when the operations of the touch device and the method for controlling the touch device are described.

The controller 140 also controls the operations related to general functions of the touch device. For example, the controller 140 controls the operations of applications that are executed along with a corresponding data displaying operation. In addition, the controller 140 receives signals, via various types of input modes, such as a touch-based input interface, and initiates and controls functions according to the input signals. The controller 140 can transmit and receive data (e.g., messages, etc.) related to an Internet service (e.g., SNS, etc.), via WLAN or mobile communication, tracks and groups the transmitted/received data, and can display the grouped data via a pop-up format.

The touch device of the invention can be applied to all types of mobile devices with a touch-based input interface, for example, a bar type, a folder type, a slide type, a swing type, a flip-flop type, etc. The touch device according to the invention includes all information communication devices, multimedia devices, and their applications, which are operated according to communication protocols corresponding to a variety of communication systems. For example, the touch device can be applied to mobile communication terminals, tablet personal computers, Portable Multimedia Players (PMPs), digital broadcast players, Personal Digital Assistants (PDAs), audio players (e.g., MP3 players), mobile game players, net book computers, smart phones, etc. In addition, the method for providing contact lists and the method for managing contact lists, according to the invention, can be adapted to televisions, Large Format Displays (LFDs), Digital Signages (DSs), media poles, laptop computers, etc.

Figure 2:
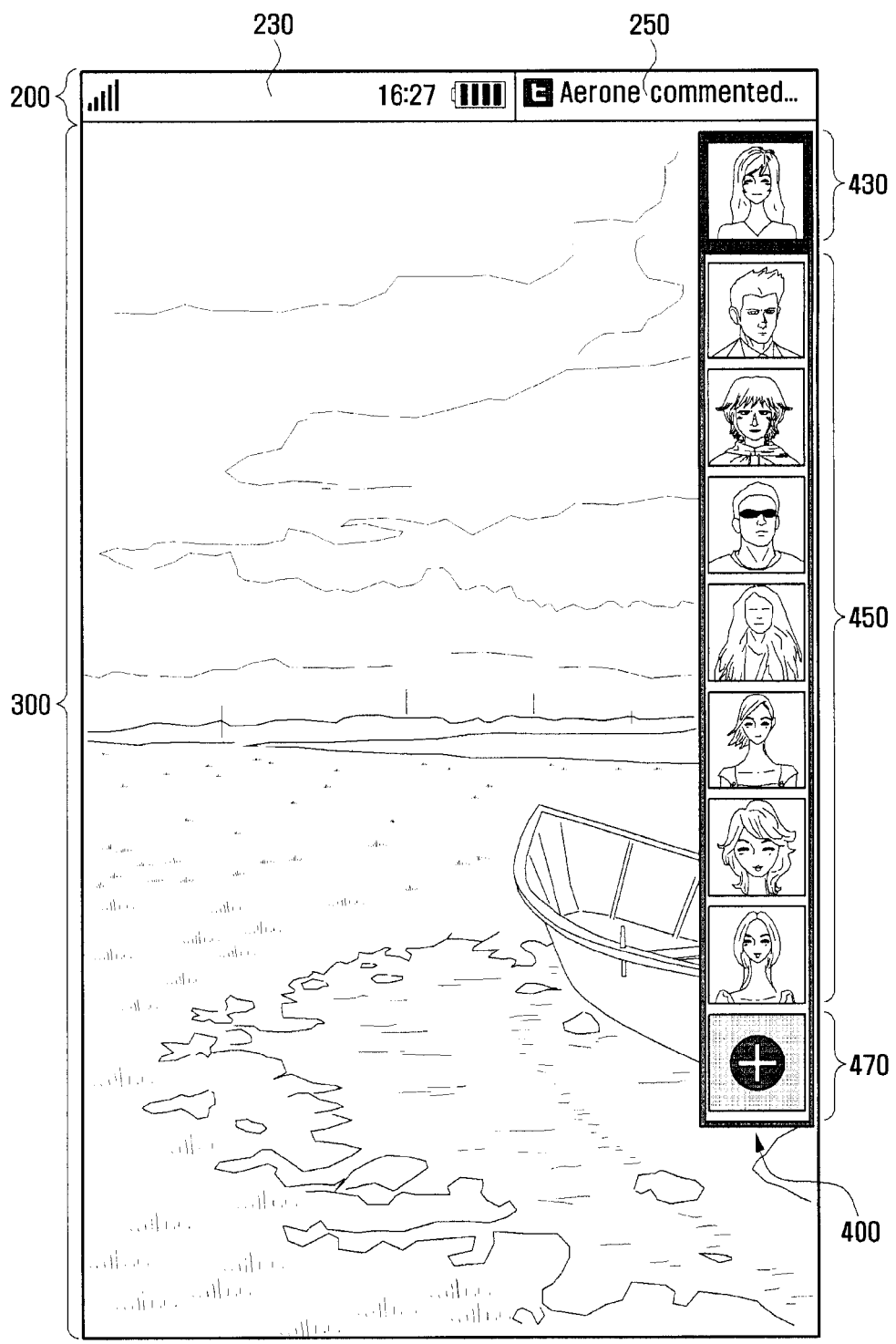
FIG. 2 and FIG. 3 illustrate screens displaying a contact tray, according to an embodiment of the invention.
Figure 3:
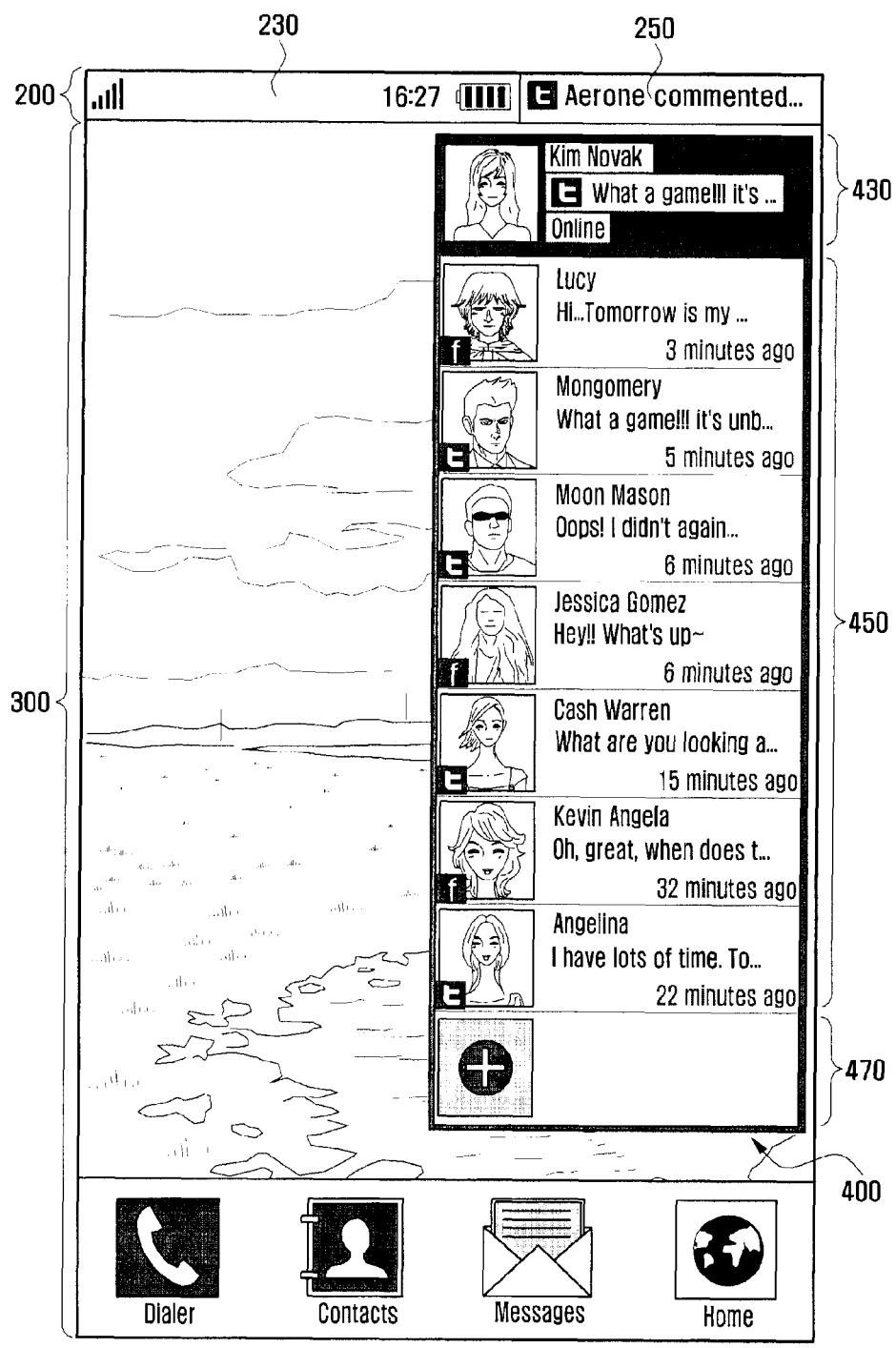

FIG. 2 and FIG. 3 illustrate screens displaying a contact tray, which are provided by the touch device according to an embodiment of the invention.

Referring to FIGS. 2 and 3, the display unit 120 is divided into a state information area 200 and an execution screen area 300.

The state information area 200 displays information about states of the touch device. In an embodiment of the invention, the state information is displayed as information items, such as a still image, a moving image, a still text, a moving text, etc. The state information area 200 can display at least one information item.

In addition, the state information area 200 is also divided into an indicator region 230 and a tray indicator region 250. The indicator region 230 and the tray indicator region 250 can each display at least one information item.

The indicator region 230 displays the state information related to the touch device, via information items. Examples of the information items are an item indicating communication signal strength, an item indicating message reception, an item indicating vibration/ring tone/no-sound information, an item indicating a state of Bluetooth activation/deactivation, an item indicating a state of Wi-Fi activation/deactivation, an item indicating a battery charging (or remaining) state, an item indicating time information, etc. It should be understood that the information items are not limited to the items listed above but instead may also include various types of items. In addition, the indicator region 230 can display one or more items according to the use environment of the touch device.

The tray indicator region 250 refers to a region toggling between showing and hiding a contact tray 400. The tray indicator region 250 can display an information item alert when an event occurs at a particular contact (user) corresponding to a tray item contained in the contact tray 400. The information item of the tray indicator region 250 may appear as combination of an image with a text corresponding to a function of the event that occurred. For example, when, as an event that occurred, data is input from a particular contact via an SNS, the tray indicator region 250 may display an image corresponding to the SNS and approximate information (e.g., a text) about the input data.

The execution screen area 300 displays screens when applications are executed in the touch device. The execution screen area 300 displays all types of execution screens supported by the touch device. For example, the execution screens may be one or more of a home screen, applications screens, which are associated with the execution of various applications, a list execution screen corresponding to various applications, etc. The execution screen area 300 may further display a contact tray 400 on the execution screens listed above. When the contact tray 400 appears on the execution screen area 300, a pop-up window 500 corresponding to a selected tray item, described later, may also appear thereon together. The contact tray 400 and the pop-up window 500 (see FIG. 6) may overlay and appear on an execution screen that is being displayed on the execution screen area 300. In the following description, the configuration of a screen showing the contact tray 400 is explained in detail.

As shown in FIGS. 2 and 3, the contact tray 400 may be comprised of a number of tray items. The tray items are mapped to contact information about at least one contact that is registered in a phone book, via a phone book menu, etc. Therefore, the tray items contained in the contact tray 400 can be created, respectively, based on contact information. For example, each tray item) may be displayed as a combination of an image according to corresponding contact information and user information (e.g., name, nickname, ID, etc.) (see FIG. 3). The tray items, contained in the contact tray 400, can be automatically registered, corresponding to contact information stored in the storage unit 130. Alternatively, the tray items, contained in the contact tray 400, can be registered, corresponding to some of the contact information stored in the storage unit 130, which complies with a user's settings.

The contact tray 400 is comprised of a first item region 430, a second item region 450, and a third item region 470. The contact tray 400 can show tray items, based on contact information, in the first and second item regions 430 and 450, or in the first, second and third item regions 430, 450 and 470. The first, second and third item regions 430, 450, and 470 can be provided, by distinguishing their boundaries to give the user an intuitive indication where the regions start and stop. For example, as shown in FIGS. 2 and 3, the background (extra space other than tray items) of the first, second and third item regions 430, 450, and 470 may be displayed in different colors. Alternatively, the tray item in the first item region 430 can be displayed to distinguish other tray items, for example, by highlighting, with different display sizes, or the like.

The contact tray 400 displays a tray item, associated with contact information corresponding to a touch device user, via the first item region 430, and a number of tray items, associated with contact information registered by the touch device user, via the second item region 450. The second item region 450 supports a function for scrolling the tray items. In an embodiment of the invention, the first and third item regions 430 and 470 serve as a fixed region that does not allow for the scroll control according to a user's interaction. However, the second item region 450 serves as a scroll region that allows for the scroll control according to a user's interaction. The scroll function will be described in detail later. The third item region 470 shows an item for editing tray items of the contact tray 400. For example, item region 470 may allow for editing by addition and/or deletion of a tray item, etc. In another embodiment of the invention, the contact tray 400 may be implemented without the third item region 470.

The contact tray 400 may provide contact information-based tray items, as shown in FIG. 2. Alternatively, the contact tray 400 may provide a combination of a contact information-based tray item, obtained from corresponding to contact information, and information about an event that has recently occurred, as shown in FIG. 3. When an event occurs from a particular contact, the method for providing contact tray, shown in FIG. 3, updates information about the event and displays the updated information. This method of FIG. 3 may be set according to a user's settings.

In the following description, the method for operating the contact tray 400 is described in detail referring to FIG. 4 to FIG. 6.

Figure 4:
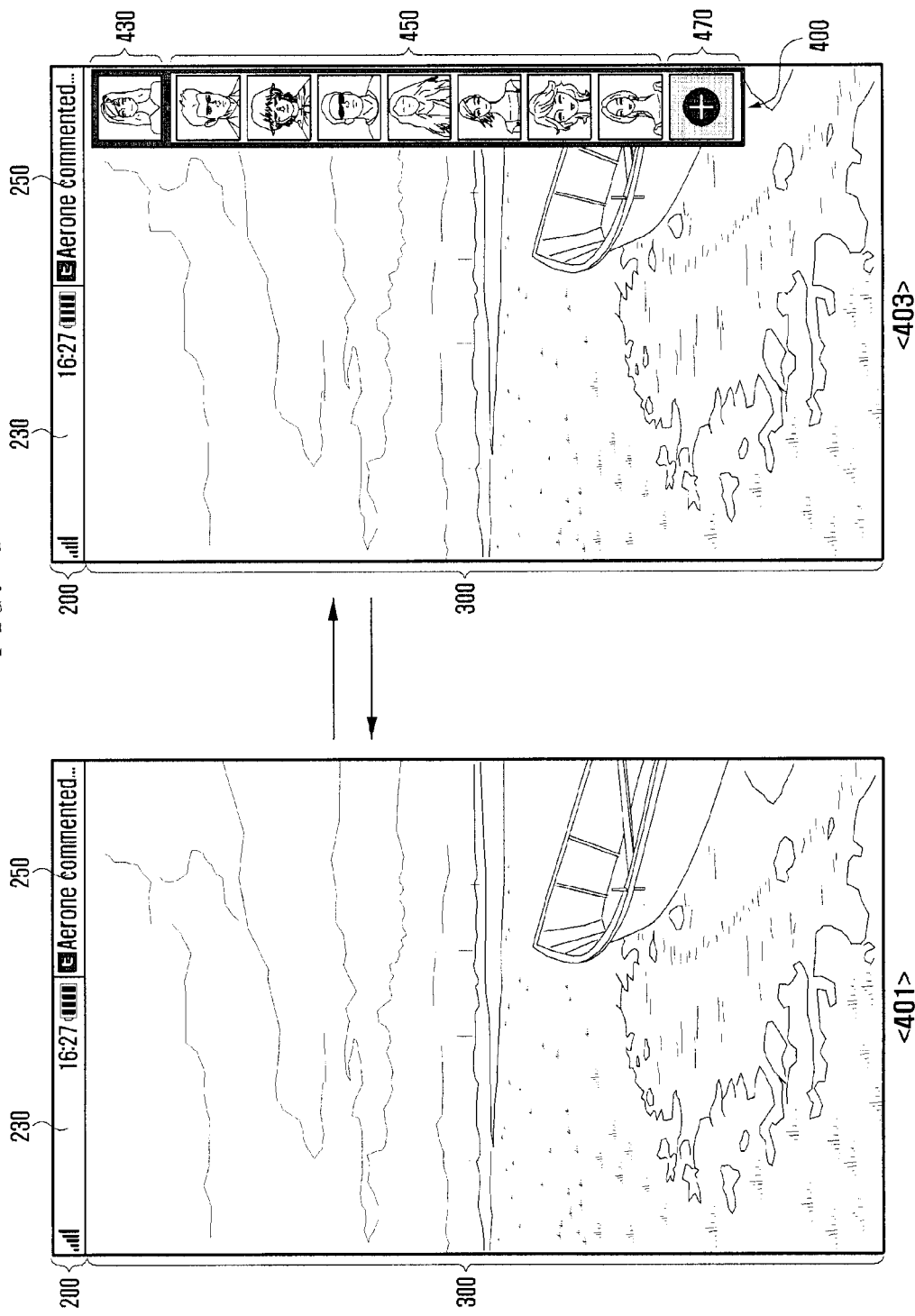
FIG. 4 illustrates screens when a contact tray is executed in the touch device according to an embodiment of the invention.

FIG. 4 illustrates screen views that describe an operation to display a contact tray 400 on an execution screen according to an embodiment of the invention. FIG. 5 illustrates screen views that describe an operation to scroll tray items in the contact tray 400 appeared on the execution screen of FIG. 4. FIG. 6 illustrates screen views that describe an operation to provide a pop-up window corresponding to one selected from among the tray items in the contact tray 400 shown in FIG. 4.

Referring to diagram 401 shown in FIG. 4, the display unit 120 is divided into a state information area 200 and an execution screen area 300. The state information area 200 is comprised of a touch device indicator region 230 and a tray indicator region 250. In this exemplary case, the execution screen area 300 shows an exemplary home screen. When the touch device is operated in a state showing the screen as shown in diagram 401, the user can input a user's touch-based interaction in the tray indicator region 250. For example, the user can input a call interaction in the tray indicator region 250 in order to call the contact tray 400 (i.e., to display the contact tray 400 on the execution screen). In an embodiment of the invention, examples of the call interaction are a tap interaction (i.e., tapping the tray indicator region 250), a sweep interaction (i.e., touching the tray indicator region 250 and then moving the touched object in a direction), and a flick interaction (i.e., touching the tray indicator region 250 and concurrently moving the touched object and untouching the indicator region 250). The user can input one of a tap, a sweep, and a flick interaction in the touch device.

When the controller 140 senses the call interaction input to the tray indicator region 250, the device displays the contact tray 400 in a known or set area on the execution screen. In the exemplary case shown in diagram 403, the contact tray 400 is displayed on the right side. Although the embodiment is implemented in such a way that the contact tray 400 is arranged at the right side of the execution screen of the display unit 120 as shown in diagram 403, it should be understood that the invention is not limited to the embodiment. For example, the embodiment may be modified in such a way that the contact tray 400 is arranged in the left, top or bottom side of the execution screen on the display unit 120. The contact tray 400 may be arranged at the bottom side adjacent to the state information area 200 on the execution screen of the display unit 120. The contact tray 400, arranged in a particular side, can be moved to any of the other sides, according to a user's interaction. The arrangement of the contact tray 400 may be set by a user's settings.

In addition, the contact tray 400 may be slid from the right to left sides, from the top to bottom sides, or from the bottom to top sides, and then displayed at the slid-to position.

The user can input a tap interaction in the tray indicator region 250 when the touch device operates in a state as shown in diagram 403. In that case, the controller 140 senses the tap interaction in the tray indicator region 250 while the contact tray 400 is appearing on the execution screen 300 as shown in diagram 403, and removes the contact tray 400 from the execution screen 300 as shown in diagram 401. The removal of the contact tray 400 can also be achieved by the reverse operation, i.e., an operation for displaying the contact tray 400.

Although it is not shown in FIG. 4, a user's interaction for calling the contact tray 400 is also achieved by) a mechanical function key, an additional touchpad, a soft key implemented on the display unit 120 (e.g., an indicator shaped as an icon or a triangle), or the like, which are not shown, but are well known in the art. In that case, the state information area 200 may be comprised of only the touch device indicator region 230 without the tray indicator region 250.

Figure 5:
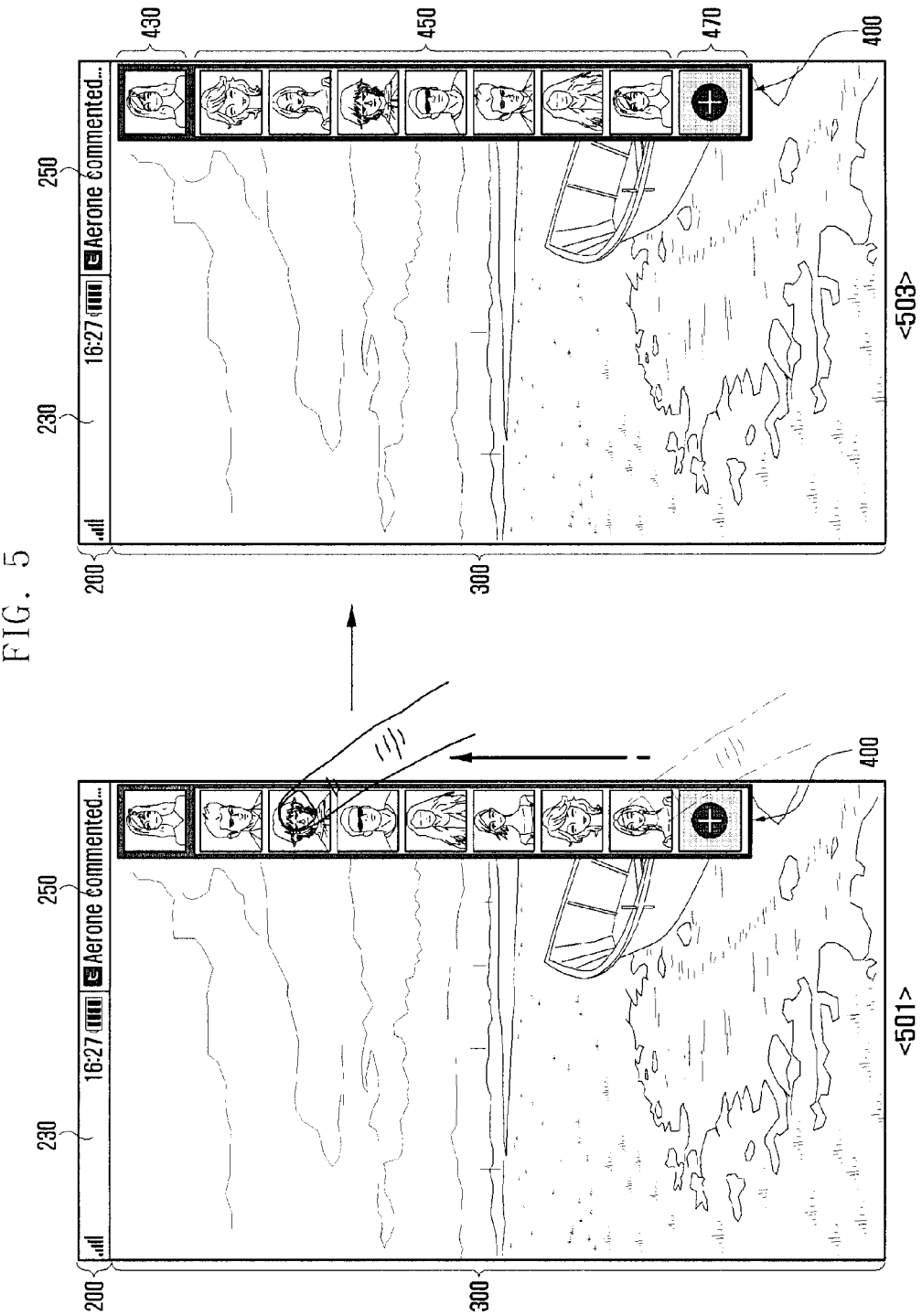
FIG. 5 illustrates screens when a contact tray is scrolled according to an embodiment of the invention.

Referring to FIG. 5, the user inputs a touch-based interaction in the display unit when the contact tray 400 appears as shown in diagram 403 of FIG. 4, according to a user's interaction, and scrolls the tray items in the contact tray 400. For example, the user can input a sweep interaction or flick interaction in the contact tray 400 from one side to another (e.g., moving their finger from the bottom to the top or vice versa), as shown in diagram 501 of FIG. 5.

The controller 140 senses the sweep interaction in the contact tray 400 shown in diagram 501. In that case, the controller 140 scrolls the tray items in the contact tray 400 according to the direction of the sweep interaction and then displays the scrolled tray items in the contact tray 400 as shown in diagram 503. The controller 140 can control the scrolling operation for the tray items, according to the input magnitude of the sweep interaction (e.g., input strength, input length, input direction, etc.), and can control the screen display corresponding to the scrolling operation.

When the controller 140 scrolls the tray items in the contact tray 400 as shown in diagrams 501 and 503, it can display the tray items, contained in the first and third item regions 430 and 470, on the fixed positions respectively, and may only scroll the tray items contained in the second item region 450. That is, a number of tray items contained in the second item region 450 can be scrolled in the vertical direction according to a user's interaction. Thus, while the tray items are being scrolled, the tray items contained in the first and third item regions 430 and 470 are not scrolled. In one aspect of the invention, the scroll may remove a tray icon from the list and replace it with a new tray icon. In another aspect, a tray icon may be moved from one end of the list to another end of the list (as if on a carrousel).

As shown, the contact tray 400 is comprised of the first and second item regions 430 and 450. The first item region 430 provides a tray item associated with contact information about the user of the touch device. The first item region 430 is a fixed region that does not support scrolling. The second item region 450 provides a number of tray items associated with contact information registered by the user. The second item region 450 is a scrolling region that allows for scrolling.

Figure 6:
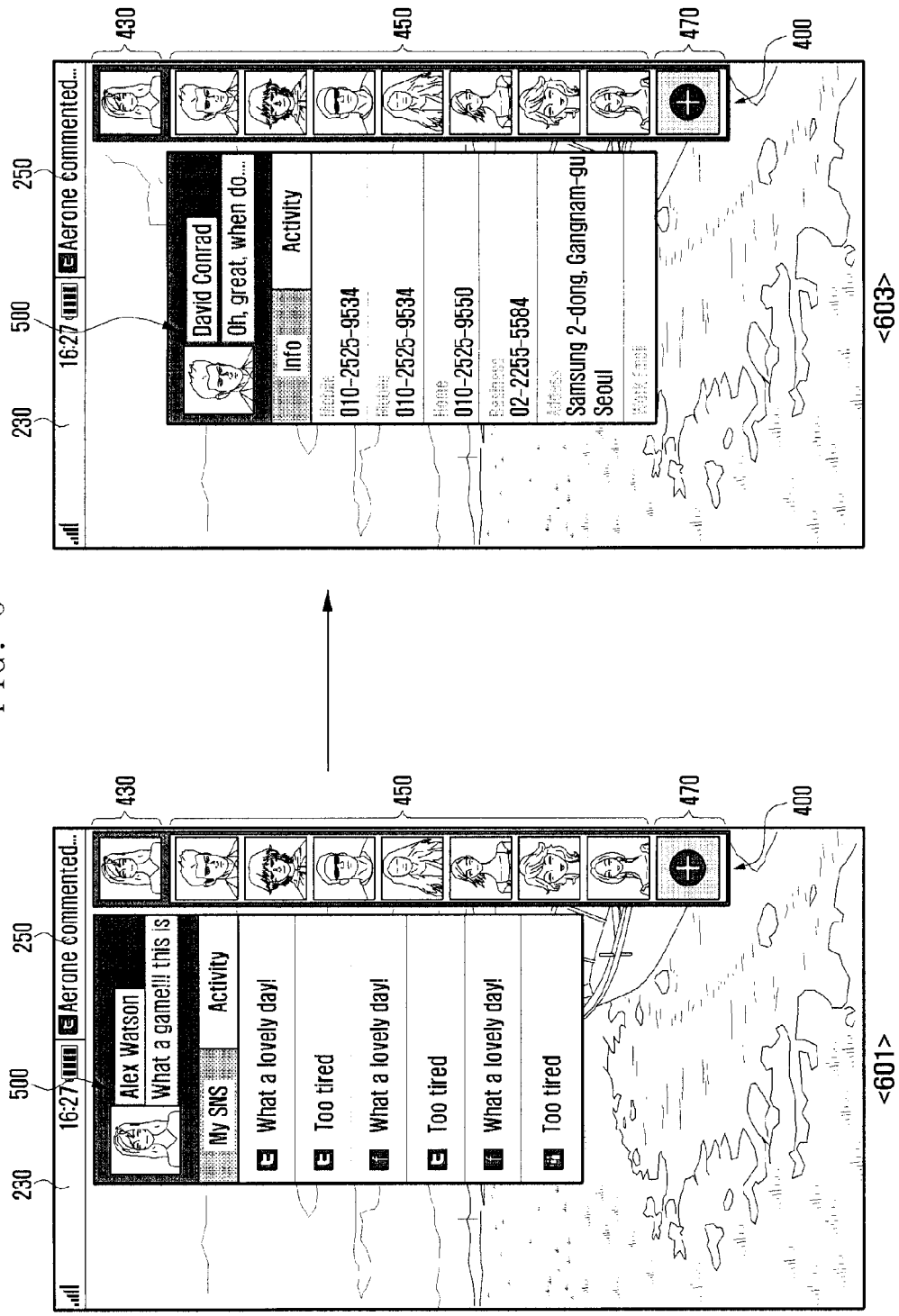
FIG. 6 illustrates screens that describe a method for operating applications using a contact tray according to an embodiment of the invention.

Referring to FIG. 6, the user inputs a touch-based interaction in the display unit when the contact tray 400 appears as shown in diagram 403 of FIG. 4, or diagram 501 or 503 of FIG. 5, according to a user's interaction, and selects a particular tray item in the contact tray 400. For example, the user can input a tap interaction to select one of a number of tray items in the contact tray 400 as shown in diagram 601 or 603 of FIG. 6.

The controller 140 senses the tap interaction for a tray item in the contact tray 400 and then displays contact information, corresponding to the tray item receiving the tap interaction, via a pop-up window 500, as shown in diagram 601 or 603. For example, when the controller 140 senses a tap interaction for a tray item from the contact tray 400, the controller 140 can identify the tray item receiving the tap interaction. After that, the controller 140 can track contact information corresponding to the identified tray item and then display the tracked contact information via pop-up window 500.

The pop-up window 500 can be displayed as being adjacent to the tray item receiving the tap interaction, as shown in diagrams 601 and 603. The pop-up window 500 can also be arranged and displayed on a highest position of the screen and adjacent to the contact tray 400, as shown in diagram 601. Alternatively, the pop-up window 500 can be arranged and displayed at the center of the execution screen, irrespective of the position of the tray item receiving the tap interaction (diagram 603). The mode of displaying the pop-up window 500 may be set by a user's settings. In addition, the pop-up window 500 may be moved to another location after its initial display.

In an embodiment of the invention, examples of the contact information are a user image set for a particular contact, a user's name, users' phone numbers (e.g., mobile phone numbers, home phone numbers, office phone numbers, etc.), email addresses, link information according to the use of Internet services (e.g., information about the other users' IDs shaped via an SNS, such as a message, Facebook, Twitter, etc., which are associated with a particular contact based on an Internet service; their home addresses; message information; memo information; etc.), etc. In addition, the contact information is divided into representative information and additional information. The representative information refers to information from among the contact information that can be set to allow for intuitively recognizing a contact. Examples of the representative information are a user's image, a user name, etc. The additional information refers to information from among the contact information that can be additionally set for a contact. The additional information contains information excluding the representative information.

In the first item region 430, a tray item can be located that is associated with contact information about the user of the touch device. In the second item region 450, a number of tray items can be located that are associated with contact information about other users, registered by the touch device user.

The pop-up window 500 can show different contact information according to the types of item regions or the types of tray items receiving a tap interaction. For example, when a user inputs a tap interaction to a tray item in the first item region 430, the pop-up window 500 can show representative information corresponding to the tray item, and link information from among the additional information, as shown in diagram 601. That is, when a tray item corresponding to a touch device user is selected, the touch device tracks data (e.g., messages) according to the use of services, such as an SNS, messenger, etc., between the user and other users, and displays it together with representative information. The touch device can intuitively display the user's history information.

When the user inputs a tap interaction to a tray item in the second item region 450, the pop-up window 500 can show representative information corresponding to the tray item (another user), and part or all of the additional information, as shown in diagram 603. The user can select particular information from the additional information shown in the pop-up window 500 in order to execute a function corresponding to the selected information. For example, the user can input a tap interaction to a particular phone number from the additional information shown in the pop-up window 500, and thus allow the device to make a call to a selected phone number. The user can also input a tap interaction to an email address from the additional information shown in the pop-up window 500 and thus enable the device to make an email to a contact with the email address. The user can further input a tap interaction to a network home address from the additional information shown in the pop-up window 500, and thus enable the device to execute a web function and display a homepage corresponding to the network home address.

Although it is not shown in FIG. 6, the user can also input a tap interaction to a tray item in the third item region 470. When a tap interaction is input to a tray item in the third item region 470, the pop-up window 500 provides an optional menu for editing (altering, deleting, adding, etc.) the contact tray 400. In addition, when a tap interaction is input, the touch device can switch the current screen to a screen for configuring the contact tray 400, for example, a screen for executing a phonebook list, etc.

For example, the contact tray 400 may be edited in such a way that a particular contact is selected on a phonebook list execution screen and moved to the contact tray 400 by inputting a movement interaction (e.g., a tap, hold and move operation), thereby adding a tray item corresponding to contact information about the selected contact to the contact tray 400. When the contact tray 400 already has a tray item with information about a contact that the user requests be added, the device can provide an indication or alarm that the contact is already contained in the contact tray 400. In which case, the user may be advised to perform an update operation that updates the contact information.

Figure 7:
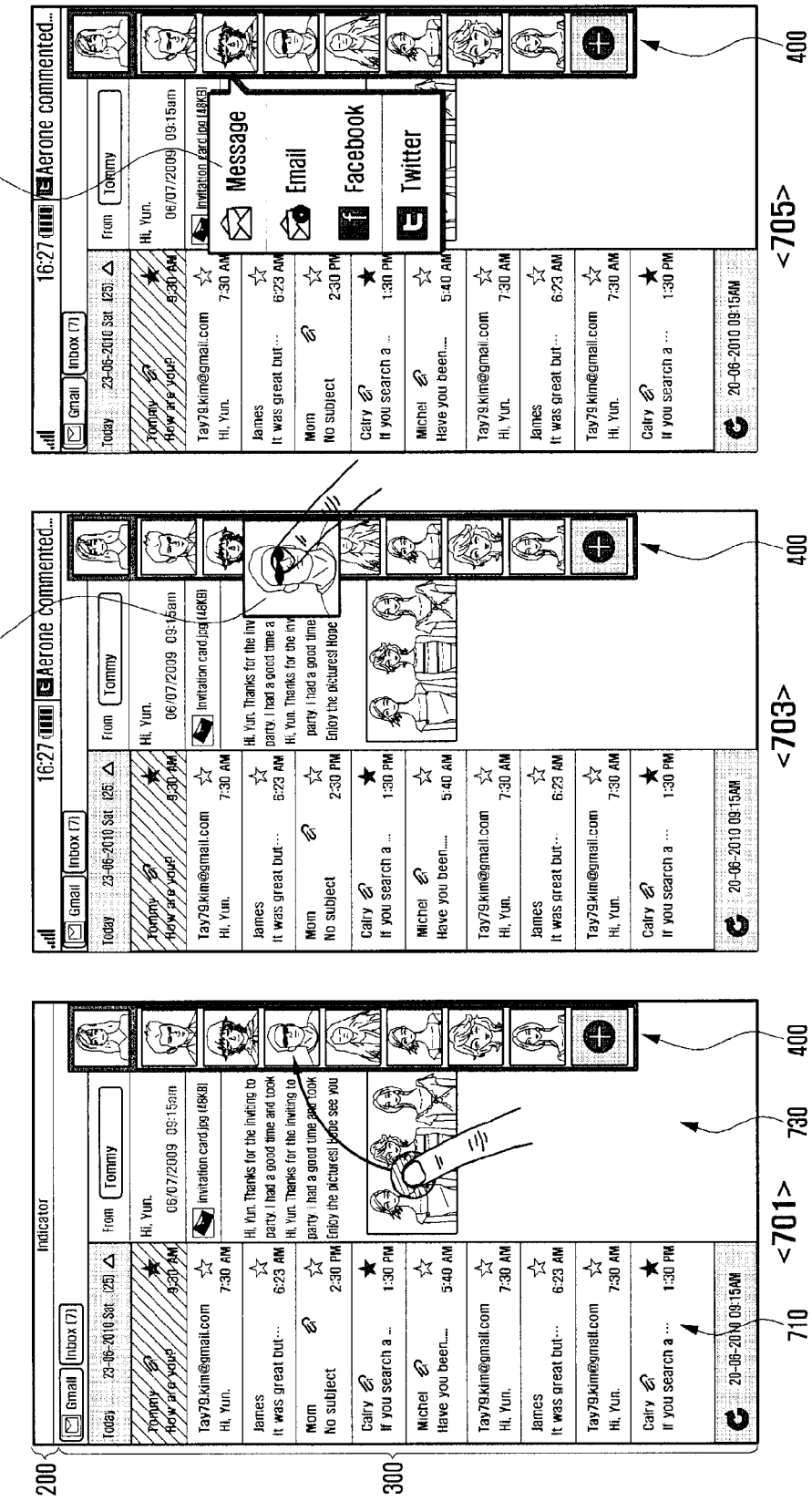
FIG. 7 to FIG. 12 illustrate screens that describe a method for operating applications, cooperating with contact information of tray items according to an embodiment of the invention.

FIG. 7 illustrates screens that describe a first embodiment of a method for operating applications, cooperating with contact information of tray items, in the touch device according to the invention.

Referring to FIG. 7, the display unit 120 displays on execution screen area 300, a screen when an application is executed. In this exemplary case, an execution screen for an email list is shown in diagram 701. The email list may be provided to one region or at least two split regions (e.g., a list view region 710 showing a list of contacts and an information view region 730 showing information about a selected contact). The contact tray 400 is displayed at one side of the execution screen.

The user selects a particular contact (content) shown in the list view region 710 or particular information (content) shown in the information view region 730, when the screen shown in diagram 701 is presented, and inputs a user interaction to move the content to a tray item of the contact tray 400 as shown in diagram 703. For example, the user can select a particular content (e.g., an image item 750, diagram 703) from among information shown in the information view region 730, when the screen shown in diagram 701 is presented, and can input an interaction (e.g., a drag interaction or a sweep interaction) to move the information to the position of the tray item 750 from among the tray items in the contact tray 400 shown in diagram 703.

The controller 140 senses the interaction that is input on the execution screen and moves to the contact tray 400 as shown in diagram 701, and provides a visual effect to a tray item (e.g., enlarging the tray item), so that it can be exhibited at a position where the content is superimposed in the contact tray 400, according to the movement of the content, thereby allowing the user to intuitively recognize tray item (or the information associated with the tray item), as shown in diagram 703. The touch device can apply a visual effect to a corresponding tray item in the contact tray 400 according to the movement of the interaction and display it with the visual effect. For example, when the interaction moves from the tray item 750 in the top direction, the tray item 750 returns the form with a visual effect applied to its original form and another tray item (above the tray item 750), designated according to the movement of the interaction, is displayed with the visual effect (not shown).

The user moves their interaction to move particular content to a position of a particular tray item (e.g., the tray item 750) in the contact tray 400 and then releases the interaction. For example, the user selects a particular content on an execution screen and drags it to a corresponding tray item in the contact tray 400, which is called a drag interaction, and then drops it, which is called a drop interaction. This interaction is called a drag & drop interaction.

The controller 140 senses the interaction's release when the diagram 703 is presented and displays a list of applications that can be executed corresponding with the contact information via a pop-up window 700 as shown in diagram 705. For example, the pop-up window 700 shows a list of applications, such as <Message>, <Email>, <Facebook>, <Twitter>, etc., as shown in diagram 705. After that, the user can select one of the applications from the pop-up window 700. The controller 140 executes the selected application and displays the executing screen (not shown) corresponding to the selected application. When the controller 140 senses an event on a tray item while the execution screen is being displayed, the controller extracts contact information regarding the tray item and configures the execution screen associated with the application, based on the extracted contact information. The controller 140 automatically inputs content, associated with the tray item (e.g., an image item 750), in the execution screen and then displays it. A detailed description about this screen will be provided with regard to FIGS. 14-16.

In the first embodiment shown in FIG. 7 as described above, when applications requiring contact information are operated via a selected tray item, the touch device can show a list of executable applications via the pop-up window 700. For example, when the user drags and drops corresponding content to a position of a tray item in the contact tray 400 while a particular application is being executed, the touch device shows a list of applications that can be executed by associating the content with contact information about the tray item. After that, the touch device can automatically configure a screen using the content and the content information, according to an item selected from the applications in the list.

Although the first embodiment is described in such a way that the applications that can be executed by associating the content in the execution screen with contact information about the tray item are previously defined, it would be recognized that the operation described can be modified in such a way that a corresponding application can be directly executed according to the type of currently executed application. These embodiments are described with regard to FIGS. 8 to 10.

Figure 8:
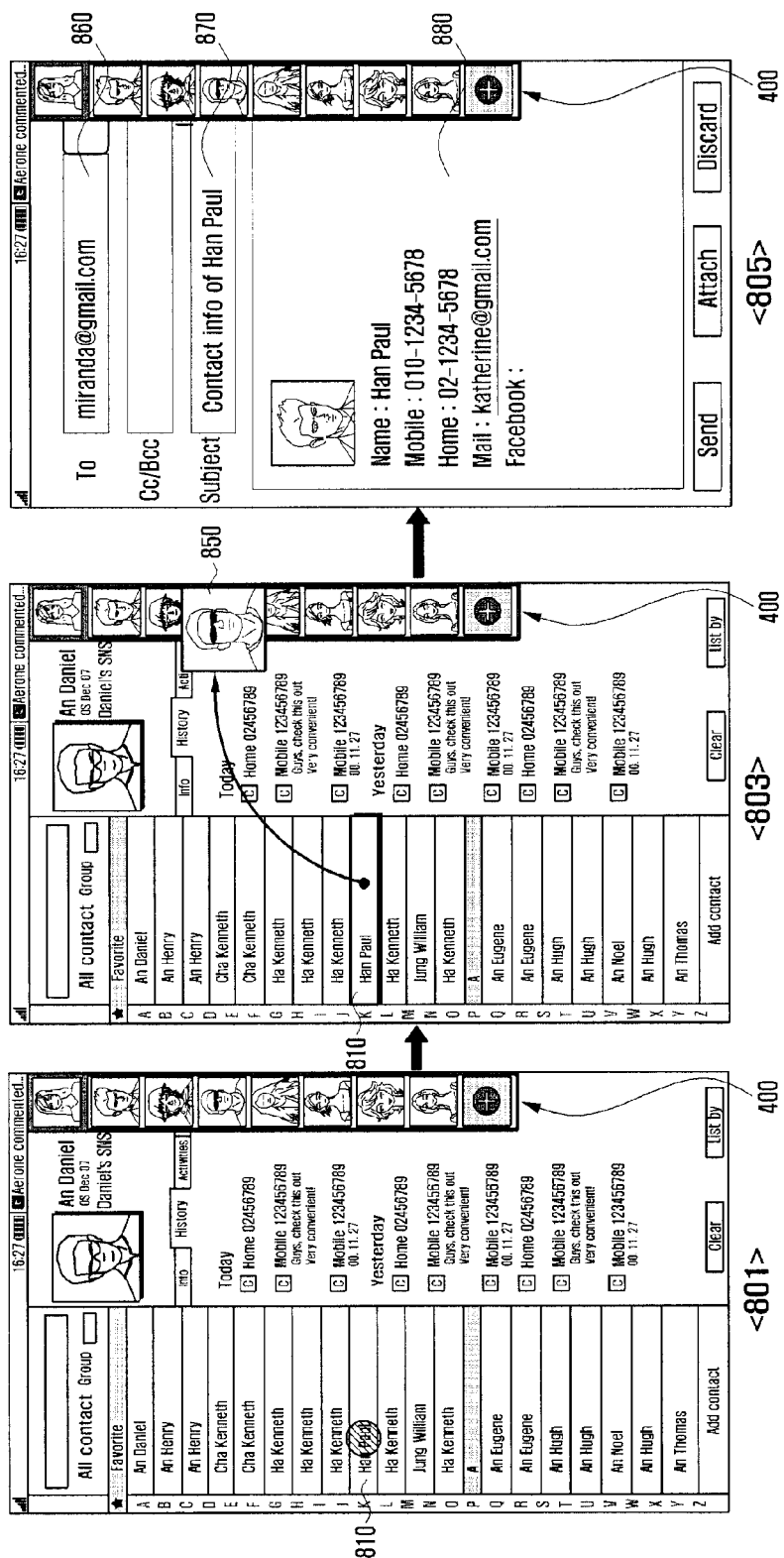

FIG. 8 illustrates screens that illustrate a second embodiment of a method for operating applications cooperating with contact information of tray items in the touch device according to the invention.

Referring to FIG. 8, the display unit 120 displays a screen corresponding to an application that is executed. For example, as shown in diagram 801 an execution screen for a contact list may be displayed on execution screen area 300. The contact list may be provided to one region or at least two split regions (e.g., a list view region 810 showing a list of contacts and an information view region shown information about a selected contact). The contact tray 400 is displayed at one side of the execution screen.

The user selects a particular content (e.g., contact 810 or 'Han Paul') in an execution screen when the touch device operates as shown in diagram 801, and inputs a user interaction to move the content to a tray item 850 of the contact tray 400 as shown in diagram 803. For example, the user can select the contact 810 (i.e., 'Han Paul') from the list of contacts shown in the execution screen and can drag and drop the selected contact to the tray item 850. As shown in diagram 803, as the interaction is moved from the location of the content 810 to the contact tray 400 (i.e., drag/drop interaction), an event occurs at the corresponding tray item 850 and the tray item 850 is thus displayed with a visual effect (e.g., enlargement).

When the controller 140 senses the illustrated interaction moves to the contact tray 400, the controller 140 executes a predefined application (e.g., an email application) and displays the execution screen as shown in diagram 805. For example, when a predefined application is an email application, the controller 140 can display a corresponding execution screen showing a variety of input fields required to write an email, as shown in diagram 805. The controller 140 can configure the execution screen, based on the tray item 850, where an event occurred, and the content 810, and can display the configured execution screen. For example, the controller 140 extracts contact information corresponding to the tray item 850 and configures a recipient information field 860. Likewise, the controller 140 extracts contact information corresponding to the content 810 and configures a subject field 870 and a body field 880.

When the controller 140 senses an event has occurred in the tray item 850 as shown in diagram 805, the controller 140 can identify a type of predefined application. For example, the user can select the contact 810 (i.e., 'Han Paul') from the list of contacts shown in the execution screen and can drag and drop the selected contact to the tray item 850. In that case, the controller 140 can extract contact information corresponding to the tray item 850 according to the application (e.g., an email application). The controller 140 can extract the contact information, based on the contact that the user previously registered in the storage unit 130 (e.g., a phonebook), matching a corresponding tray item. The controller 140 can extract an email address (e.g., 'miranda@gmail.com') from the contact information registered in the tray tem 850, according to the email application. The controller 140 can configure the execution screen by inputting the extracted email address (e.g., 'miranda@gmail.com') to the recipient information field 860. That is, the controller 140 can automatically designate a recipient based on the contact information of the tray item 850.

The controller 140 can configure an execution screen with the content 810 or information (e.g., contact information) corresponding to the content 810, according to the type of selected content 810 or the type of application that is executed. The controller 140 can extract information about a contact registered in the selected content 810 when the content 810 is a contact and an executed application is an email application. The controller 140 can configure an execution screen by inputting the extracted contact information into the body field 880. In addition, when the contact information about a particular contact is sent to a recipient corresponding to a tray item as shown in FIG. 8, the controller 140 can create 'Contact info of Han Paul' and automatically input it to the subject field 870.

Figure 9:
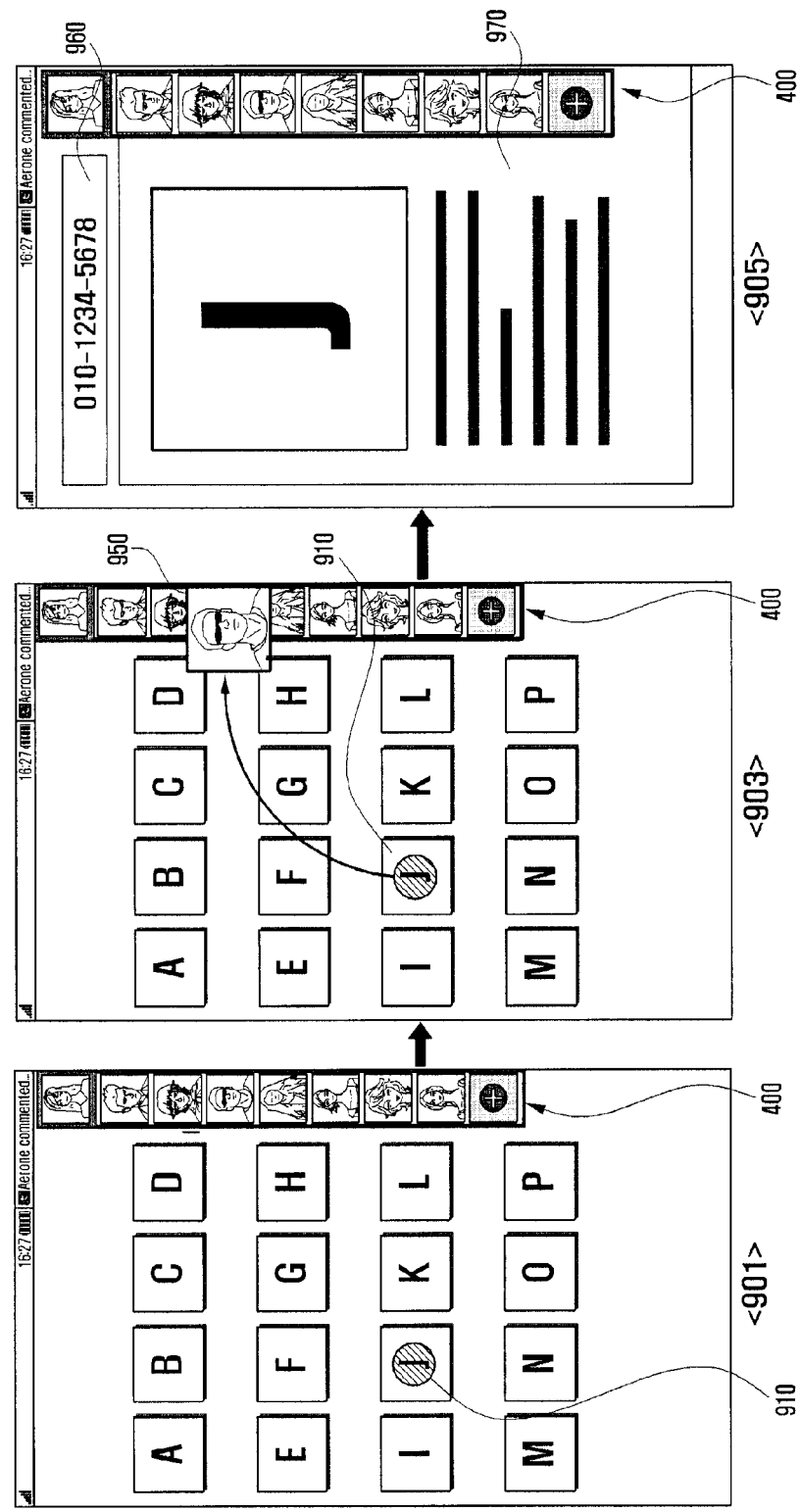

FIG. 9 illustrates screens that describe a third embodiment of a method for operating applications cooperating with contact information of tray items in the touch device according to the invention.

Referring to FIG. 9, the display unit 120 displays a screen when an application is executed. For example, diagram 901 illustrates an execution screen for a photograph list displayed on execution screen area 300. The photograph list may be provided as a block type by thumbnails of stored photographs or as a list type by photographs and text information describing the photographs, as shown in FIG. 9. The contact tray 400 may be displayed at one side of the execution screen.

The user selects a particular content (e.g., a particular photograph 910) among the content presented on the execution screen when the execution screen is presented as shown in diagram 901, and inputs a user interaction to move the content to a tray item 950 of the contact tray 400 as shown in diagram 903. For example, the user can select the photograph 910 from the list of photographs shown in the execution screen, and can drag and drop it to the tray item 950. As shown in diagram 903, as a drag and drop interaction is moved to the contact tray 400 of the content 910, an event occurs at a corresponding tray item 950 and the tray item 950 is thus displayed with a visual effect (e.g., enlargement).

When the controller 140 senses the interaction (for example, the user can select the photograph 910 from the list of photographs shown in the execution screen, and can drag and drop it to the tray item 950) that is input to the execution screen, the controller 140 executes a predefined application (e.g., an MMS application) and displays the execution screen as shown in diagram 905. For example, when a predefined application is an MMS application, the controller 140 can display an execution screen showing a variety of input fields required to write an MMS, as shown in diagram 905. The controller 140 can configure an execution screen, based on the tray item 950, where an event occurred, and the contact 910, and can display the configured execution screen. For example, the controller 140 extracts contact information corresponding to the tray item 950 and configures a recipient information field 960. The controller 140 also configures a body field (or an attachment field) 980 by the content 910.

When the controller 140 senses an event has occurred (for example, the user can select the photograph 910 from the list of photographs shown in the execution screen, and can drag and drop it to the tray item 950.) in the tray item 950 as shown in diagram 905, the controller 140 can identify a type of predefined application. In that case, the controller 140 can extract contact information corresponding to the tray item 950 according to the application (e.g., an MMS application). The controller 140 can extract a mobile phone number (e.g., 010-1234-5678) from the contact information that is registered in the tray item 950, according to the MMS application. The controller 140 can configure an execution screen by inputting the extracted mobile phone number (e.g., 010-1234-5678) to the recipient information field 960. That is, the controller 140 can automatically designate a recipient based on the contact information of the tray item 950.

The controller 140 can configure an execution screen with the content 910 or information corresponding to the content 910, according to the type of selected content 910 or the type of application that is executed. When the selected content 910 is a photograph and the executed application is an MMS application, the controller 140 can configure an execution screen by inputting the photograph of the content 910 into the body field 980. The controller 140 can additionally input the photograph and additional information, for example, text information, in the body field 980, as shown in FIG. 9.

Figure 10:
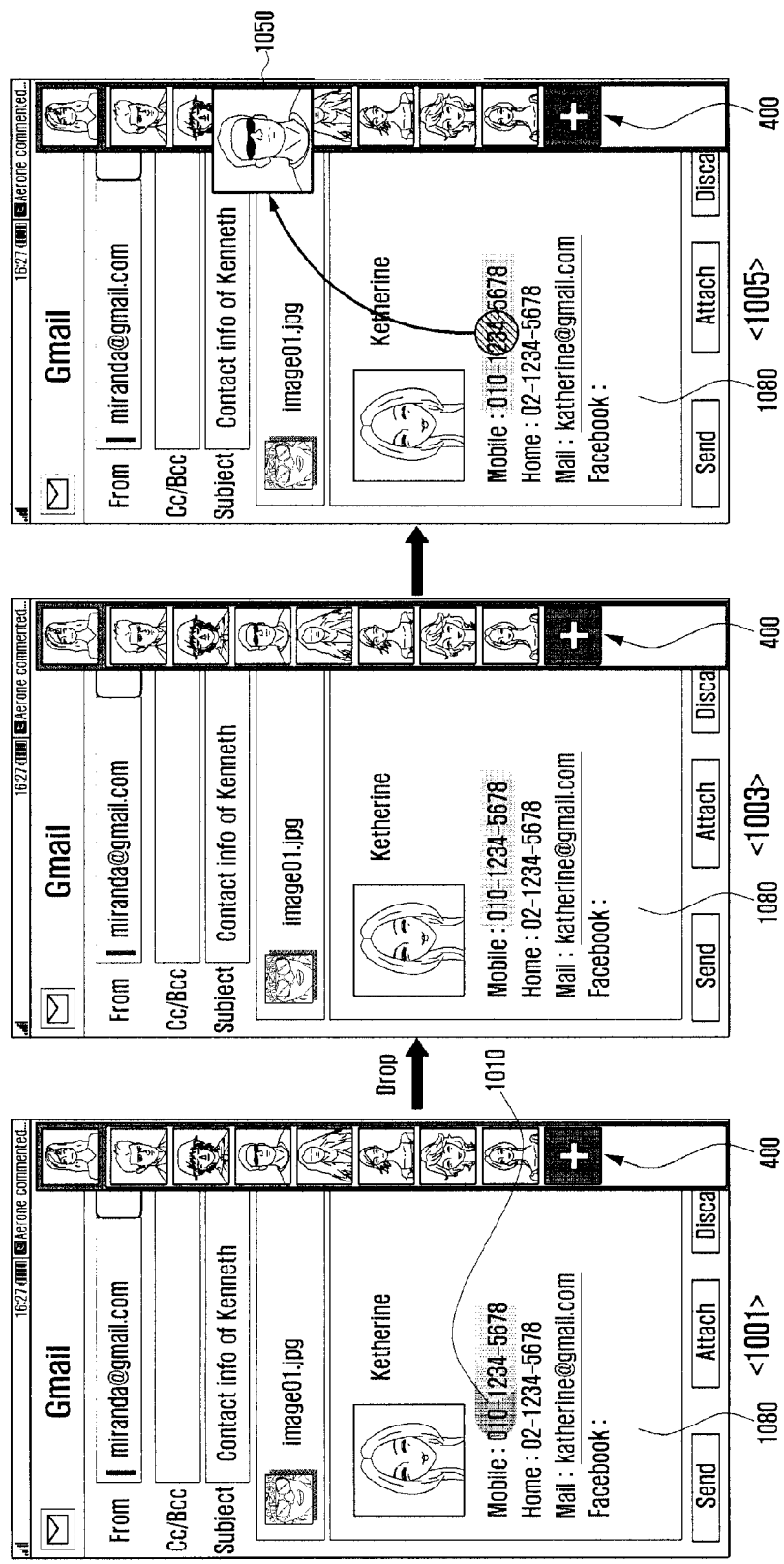

FIG. 10 illustrates screens that describe a fourth embodiment of a method for operating applications cooperating with contact information of tray items in the touch device according to the invention.

Referring to FIG. 10, the display unit 120 displays a screen when an application is executed. For example, diagram 1001 illustrates an execution screen for a reception email on execution screen area 300. The contact tray 400 is displayed at one side of the execution screen.

The user can select a particular content (e.g., a text 1010) in an execution screen when the touch device operates as shown in diagram 1001. In an embodiment of the invention, the user selects a text (e.g., 010-1234-5678) as part of the content, as shown in FIG. 10. For example, the user can input a drag or sweep interaction to designate a corresponding text (e.g., 010-1234-5678), as the content, in the body field 1080 on the reception email execution screen, as shown in diagram 1001.

The user designates the text (e.g., 010-1234-5678) as a block on as shown in diagram 1001 and selects the text block as shown in diagram 1003. The user may then input an interaction to move the selected text block to a tray item 1050 of the contact tray 400 as shown in diagram 1005. For example, the user can select the designated text (text block) 1010 from the content presented on the execution screen 300, and can drag and drop it to the tray item 1050. As shown in diagram 1005, as an interaction is moved to the contact tray 400 of the content 1010, an event occurs at a corresponding tray item 1050 and the tray item 1050 is thus displayed with a visual effect.

When the controller 140 senses the interaction input to the execution screen moves to the contact tray 400, the controller 140 executes a predefined application and displays a list of executable applications on a pop-up window form which an application may be selected or may be a specific application, as described with reference to FIGS. 7 to 9 or.

For example, when the predefined application is an email application, the controller 140 can execute the email application and configure a corresponding execution screen, as described in the section referring to diagram 805 of FIG. 8. Likewise, when the predefined application is an MMS application, the controller 140 can execute the MMS application and configure a corresponding execution screen, as described in section referring to diagram 905 of FIG. 9. In addition, the controller 140 can also execute a variety of predefined applications, such as Facebook, Twitter, etc., and configure corresponding execution screens. However, when a pre-defined application is not defined, the controller 140 can display a list of executable applications via a pop-up window, as described in the section referring to diagram 705 of FIG. 7, so that the user can select an application from among the applications in the list. After that, the controller 140 executes the user's selected application and configures a corresponding execution screen.

In the foregoing description referring to FIGS. 7 to 10, the methods for operating applications have been explained where a user interaction that moves the content to a position of a tray item in the contact tray 400. The following description provides the methods for operation applications where a user interaction moves a tray item from the contact tray 400 to an execution screen where the applications are executed.

Figure 11:
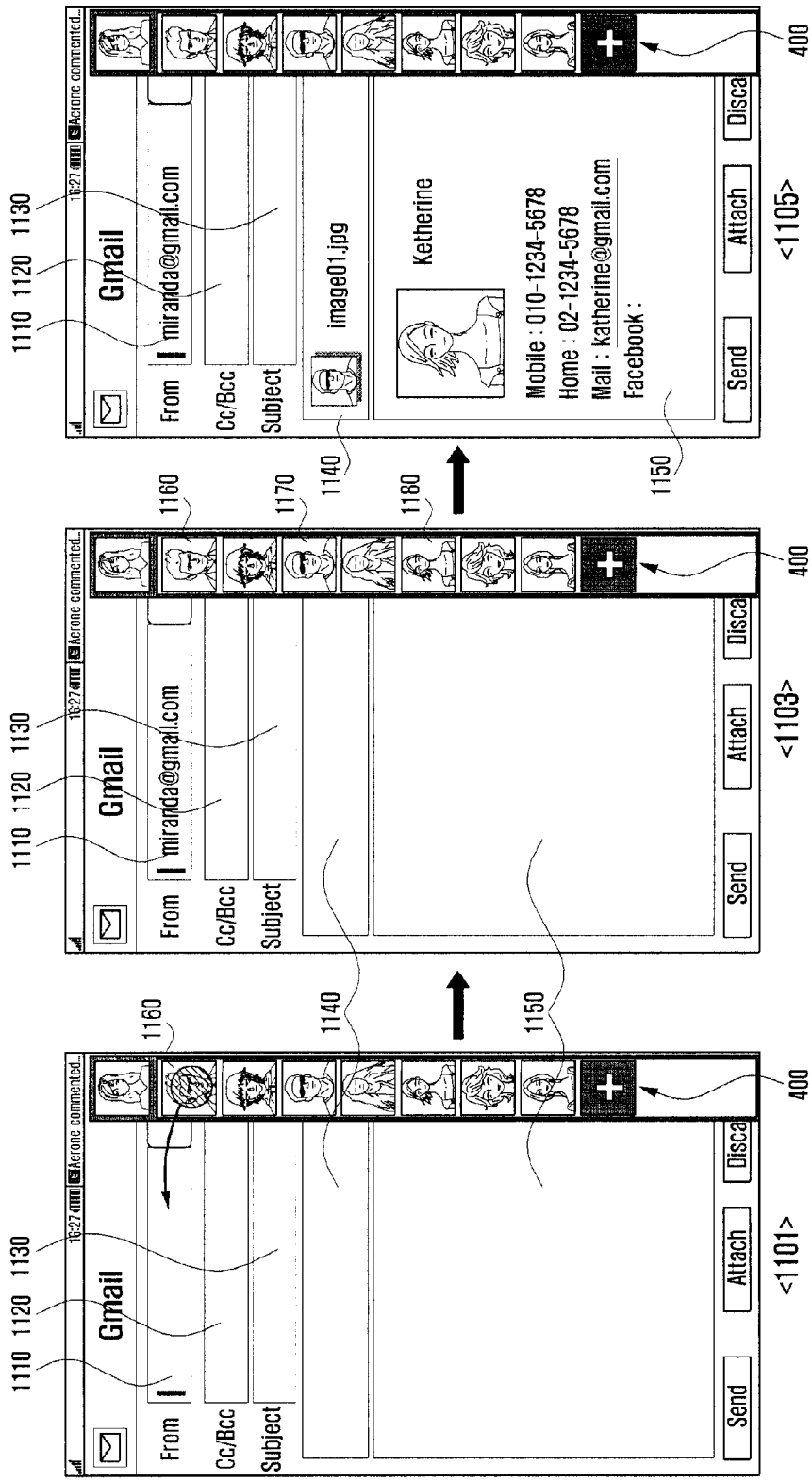

FIG. 11 illustrates screens that describe a fifth embodiment of a method for operating applications, cooperating with contact information of tray items, in the touch device according to the invention.

Referring to FIG. 11, the display unit 120 displays a screen when an application is executed, for example, an execution screen for an email writing, on an execution screen area 300 as shown in diagram 1101. In an embodiment of the invention, the email writing execution screen shown in diagram 1101 includes a recipient information field 1110, a reference information field 1120, a subject field 1130, an attachment field 1140, and a body field 1150. It is assumed that the fields 1110, 1120, 1130 and 1140 of the email writing execution screen are empty in the initial state, as shown in diagram 1101. The contact tray 400 is displayed at one side of the execution screen.

The user can configure an execution screen with contact information corresponding to a tray item of the contact tray 400 when the execution screen is presented as shown in diagram 1101. For example, the user selects a first tray item 1160 from the contact tray 400 as shown in diagram 1101, and inputs a user interaction to move (drag/drop interaction) the selected tray item to the recipient information field 1110 as shown in diagram 1103. The user can select the first tray item 1160 from the contact tray 400, and can drag and drop the selected item to the recipient information field 1110 in the email writing execution screen.

The controller 140 senses the interaction that selects a particular item from the contact tray 400 and moves selected item to the execution screen, it can configure an execution screen, based on contact information corresponding to the tray item as shown in diagrams 1103 and 1105.

When the controller 140 senses an event (for example, the user can select the first tray item 1160 from the contact tray 400, and can drag and drop the selected item to the recipient information field 1110 in the email writing execution screen) that occurred in the tray item 1160 as shown in diagram 1103, the controller 140 can extract contact information corresponding to the tray item 1160. In addition, the controller 140 can identify a type of area (e.g., types of input fields corresponding to the executed applications) in the execution screen, to which the tray item 1160 is moved, and can then extract contact information corresponding to the identified type of area. For example, when the tray item 1160 is the recipient information field 1110 as shown in FIG. 11, the controller 140 can extract an email address (e.g., 'miranda@gmail.com') from the contact information, corresponding to the tray item 1160. After that, the controller 140 inputs the extracted email address (e.g., 'miranda@gmail.com') to the recipient information field 1110, thereby configuring an execution screen. That is, the controller 140 can automatically designate a recipient based on the contact information of the tray item 1160. In addition, when the executed application is an MMS application and the type of area to which the tray item 1160 is moved is a recipient information field, the controller 140 extracts a mobile phone number from the contact information of the tray item and then input it to the recipient information field.

The user can input information about a number of recipients to broadcast an email to each of them. For example, the user can configure the recipient information field 1110 or the reference information field 1120 by moving other tray items to the recipient information field.

The user can configure an execution screen using a first tray item 1170 and a third tray item 1180 as shown in diagram 1105. For example, the user drags and drops the second tray item 1170 to the attachment field 1140, thereby attaching a user image from the contact information about the second tray item 1170. In that case, the controller 140 identifies a type of area to which the second tray item 1170 is moved, extracts a user image from the contact information about the second tray item 1170, corresponding to the identified type of area, and then attaches the extracted user image to the attachment field 1140. Likewise, the user may drag and drop the third tray item 1180 to the body field 1150, thereby inputting the contact information about the third tray item 1180. In that case, the controller 140 identifies a type of area to which the third tray item 1180 is moved, extracts the contact information about the third tray item 1180, corresponding to the identified type of area, and then inputs the extracted contact information to the body field 1150.

While the applications are being operated according to the fifth embodiment shown in FIG. 11, considering a user's convenience and the operation intuitiveness using the tray items, when a tray item is moved to an area where contact information cannot be used, the controller 140 can provide a function for providing an alarm or an indication that it is not possible for the tray item to move. This function is described, in detail, with reference to FIG. 12.

Figure 12:
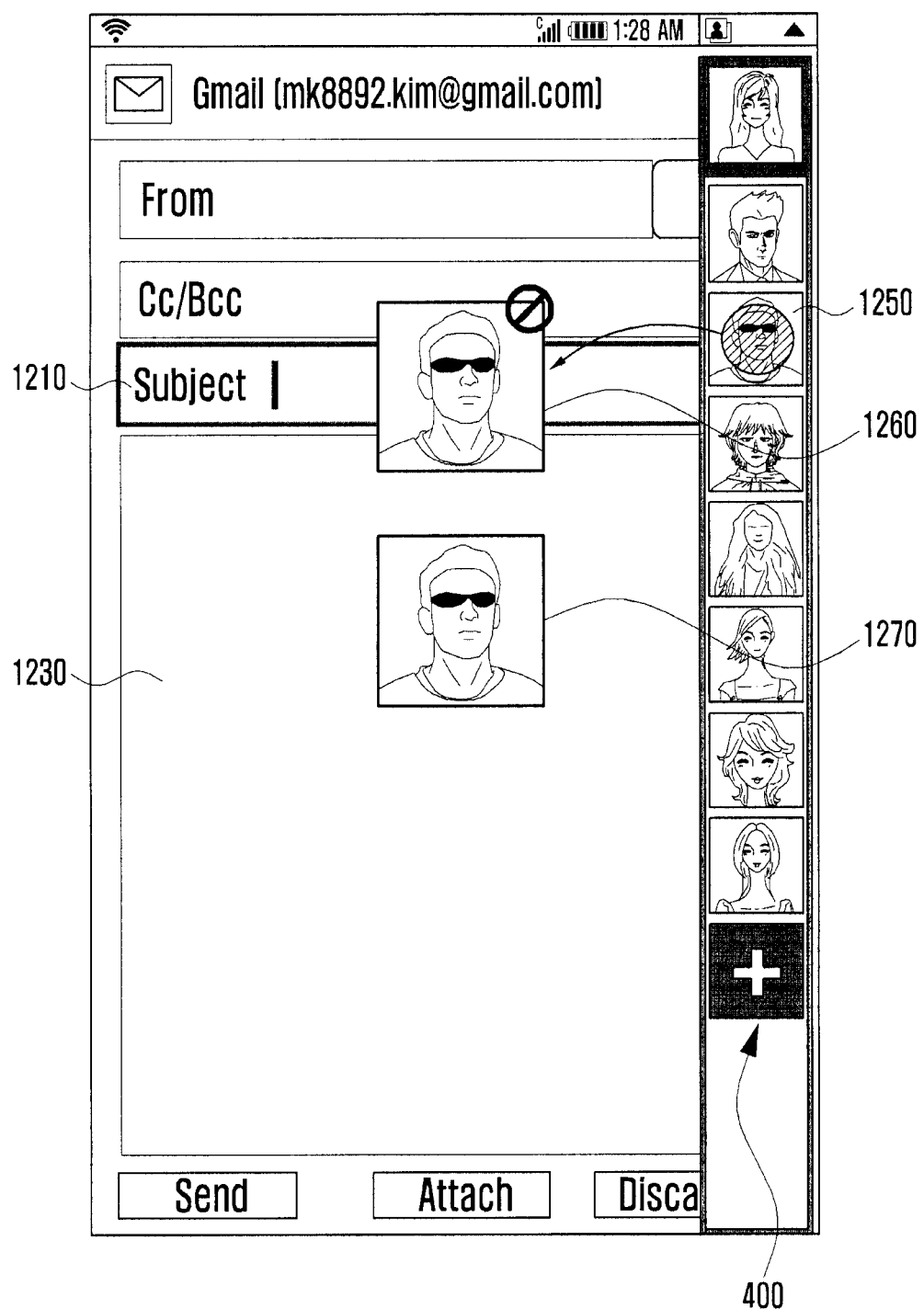

FIG. 12 illustrates screens that describe a sixth embodiment of a method for operating applications cooperating with contact information of tray items in the touch device according to the invention.

Referring to FIG. 12, the display unit 120 displays a screen when an application is executed. In this exemplary case, an execution screen for an email writing application is presented on the execution screen area 300 as described in the section referring to FIG. 11. The email writing execution screen includes a subject field 1210, a body field 1230, etc. It is assumed that the subject field 1210 is a region to which a tray item cannot be moved, i.e., a region that cannot be operated based on contact information. The contact tray 400 is displayed at one side of the execution screen.

The user can input a user interaction that moves a tray item 1250 from the contact tray 400 to the execution screen shown in FIG. 12. For example, the user selects the tray item 1250 in the contact tray 400 and then drags and sweeps it to the email writing execution screen.

When the controller 140 senses the interaction that selects the tray item 1250 and moves the tray item 1250 from the contact tray 400 to the execution screen, the controller 140 identifies a type of area where the tray item 1250 is located to determined types of input fields to be provided according to the application. In addition, the controller 140 determines whether the identified area can receive a contact information-based input. After that, the controller 140 applies a visual effect to a floating item corresponding to the tray item 1250 and displays the visually effected item, according to the determination as to whether the identified area can receive a contact information-based input.

For example, it is assumed that the email writing execution screen is configured such that the subject field 1210 cannot receive a contact information-based input and the body field 1230 can receive a contact information-based input. When the tray item 1250 is moved from the contact tray 400 to the execution screen according to a user interaction, its moved path can be visually shown via a floating item 1260 or 1270.

In an embodiment of the invention, when the tray item is moved, it can be shown as a floating item 1260 or 1270 according to the type of area where it is located, in order to provide intuitiveness to the user. For example, when the tray item 1250 is moved and located above an area corresponding to the subject field 1210 according to a user interaction, a floating item 1260 may appear that indicates that the contact information-based input of the tray item 1250 cannot be input to the subject field 1210. However, when the tray item 1250 is moved and located above an area corresponding to the body field 1230 according to a user interaction, a floating item 1270 may appear that indicates that the contact information-based input of the tray item 1250 can be input to the body field 1230. The floating items 1260 and 1270 can appear adaptively based on which type of area to which the user interaction moves the item.

When the user releases, or ends, their interaction from an area where the tray item 1250 is located and simultaneously the floating item 1260 corresponding thereto appears, the area does not receive the contact information about the tray item 1250. On the contrary, when the user releases their interaction from an area where the tray item 1250 is located and simultaneously the floating item 1270 corresponding thereto appears, the area receives and displays the extracted contact information about the tray item 1250.

Figure 13:
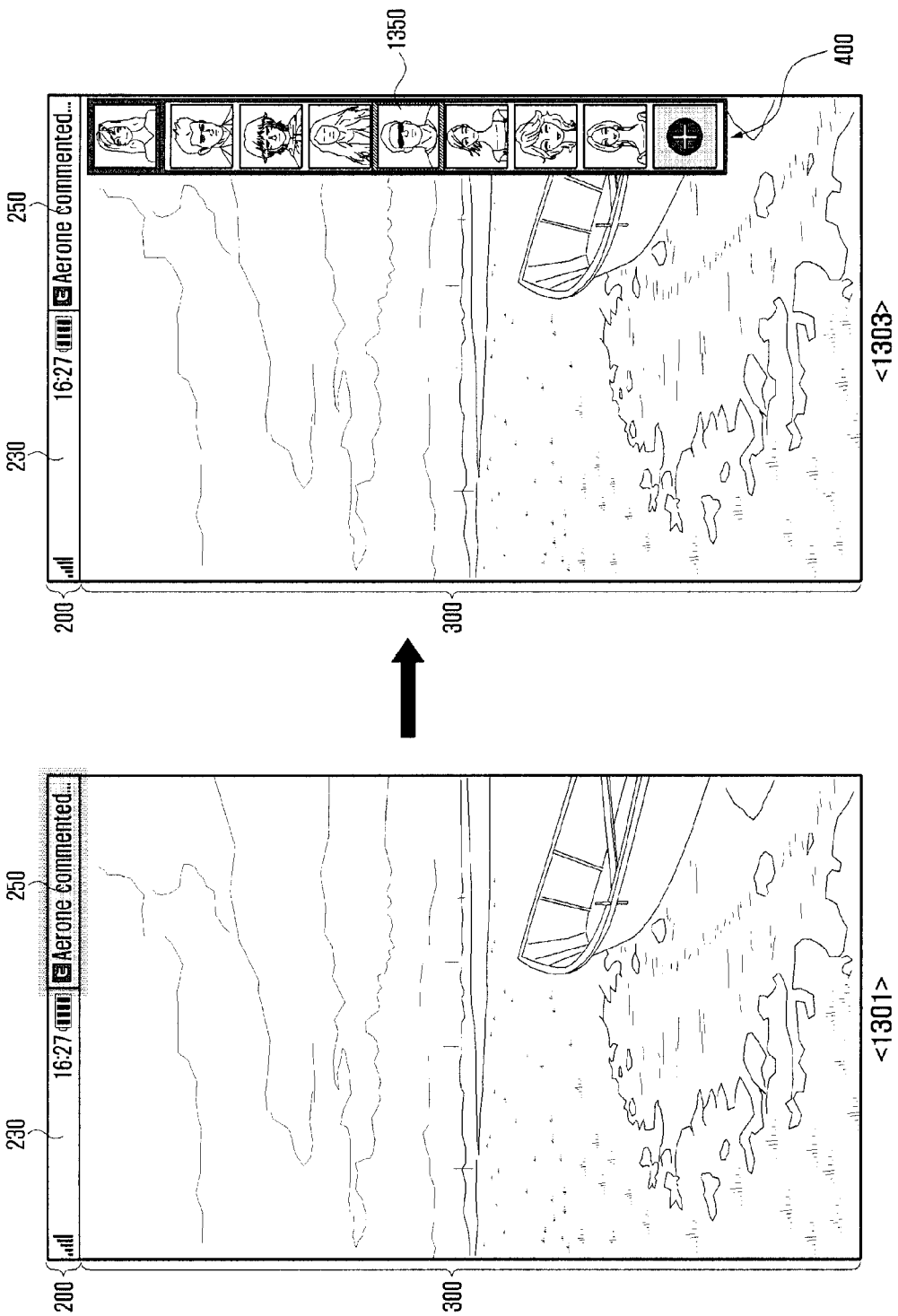
FIG. 13 illustrates screens that illustrate a process of alerting a user of the occurrence of an event and tracking the event via a contact tray according to an embodiment of the invention.

FIG. 13 illustrates screens that describe a process of alerting the user of the occurrence of an event and tracking it via a contact tray, in a touch device according to an embodiment of the invention.

Referring to FIG. 13, diagrams 1301 and 1303 respectively show states before and after the contact tray 400 is activated. It is assumed that an event (e.g., communication events, such as, email reception, message reception, data registration according to SNS, etc.) occurs from a particular contact (user) corresponding to one of the tray items in the contact tray 400, in a state before the contact tray 400 is activated as shown in diagram 1301.

When a communication event occurs from a particular contact, the controller 140 can generate an alarm indicating that the communication event occurred via a tray indicator region 250 as shown in diagram 1301. In that case, the tray indicator region 250 can be flickered, altered in color, highlighted, etc. to indicate an alarm in a visual mode. Alternatively, alarming the occurrence of a communication event via the tray indicator region 250 may also be indicated by combining with at least one of a vibration and an audio sound.

The user can input a preset user interaction to the tray indicator region 250 in a state where an alarm according to a communication event occurs, as shown in diagram 1301. For example, the user can input an interaction for calling the contact tray 400 in the tray indicator region 250. In an embodiment of the invention, the call interaction includes an interaction for tapping the tray indicator region 250, sweep interaction and flick interaction, which touch the tray indicator region 250 and moves in the bottom direction, etc. The user can previously set one of the interactions listed above to a call interaction and input it when an alarm occurs.

The user senses a call interaction input to the tray indicator region 250 when the touch device operates as shown in diagram 1301, and displays the contact tray 400 at one side of the execution screen as shown in diagram 1303. The controller 140 can track a tray item corresponding to the occurrence of the communication event. For example, the controller 140 can track a tray item, based on contact information, according to a communication event.

The controller 140 applies a visual effect to the tracked tray item and displays the visually effected tray item in order to distinguish it from the other tray items. For example, the controller 140 can apply a visual effect to a tray item corresponding to a communication event, such as flickering, altering color, highlighting, etc., so that the tray item can be displayed, distinguishing from the other tray items.

Meanwhile, the contact tray 400 appearing on a current screen may not show the tracked tray item according to the communication event. In that case, a scroll operation needs to show the tracked tray item. In an embodiment of the invention, considering a user's convenience and intuitiveness for tracking a tray item corresponding to a communication event, when a scrolling operation needs to show the tracked tray item according to the occurrence of a communication event, it can be automatically position of the tracked tray item. When the tracked tray item appears according to the scrolling operation, the tray item can be displayed with a visual effect in the contact tray 400.

Although it is not shown in the drawings, the contact tray 400 appears overlaid on all the execution screens, i.e., above the uppermost layer. However, an execution screen may appear lower than an execution screen that has a priority. For example, it is assumed that a first execution screen (e.g., an email writing execution screen) appears and then the contact tray 400 appears thereon. In that case, when the user calls a virtual keypad to input text in the email writing execution screen, a second execution screen according to the virtual keypad (i.e., the keypad execution screen) may appear above the contact tray 400. In that case, the layers of the display unit 120 are arranged as the first execution screen in the lowest position, the contact tray 400 in the middle position and the second execution screen in the highest position. This is to allow the user to easily input text to the touch device. Alternatively, when the display unit 120 is configured in such a way that the contact tray 400 does not always appear at the highest layer, an execution screen such as a virtual keypad execution screen may need to set its appearance area not to invade the contact tray 400. To this end, the width of the virtual keypad can be adjacent to the boundary of the contact tray 400.

Figure 14:
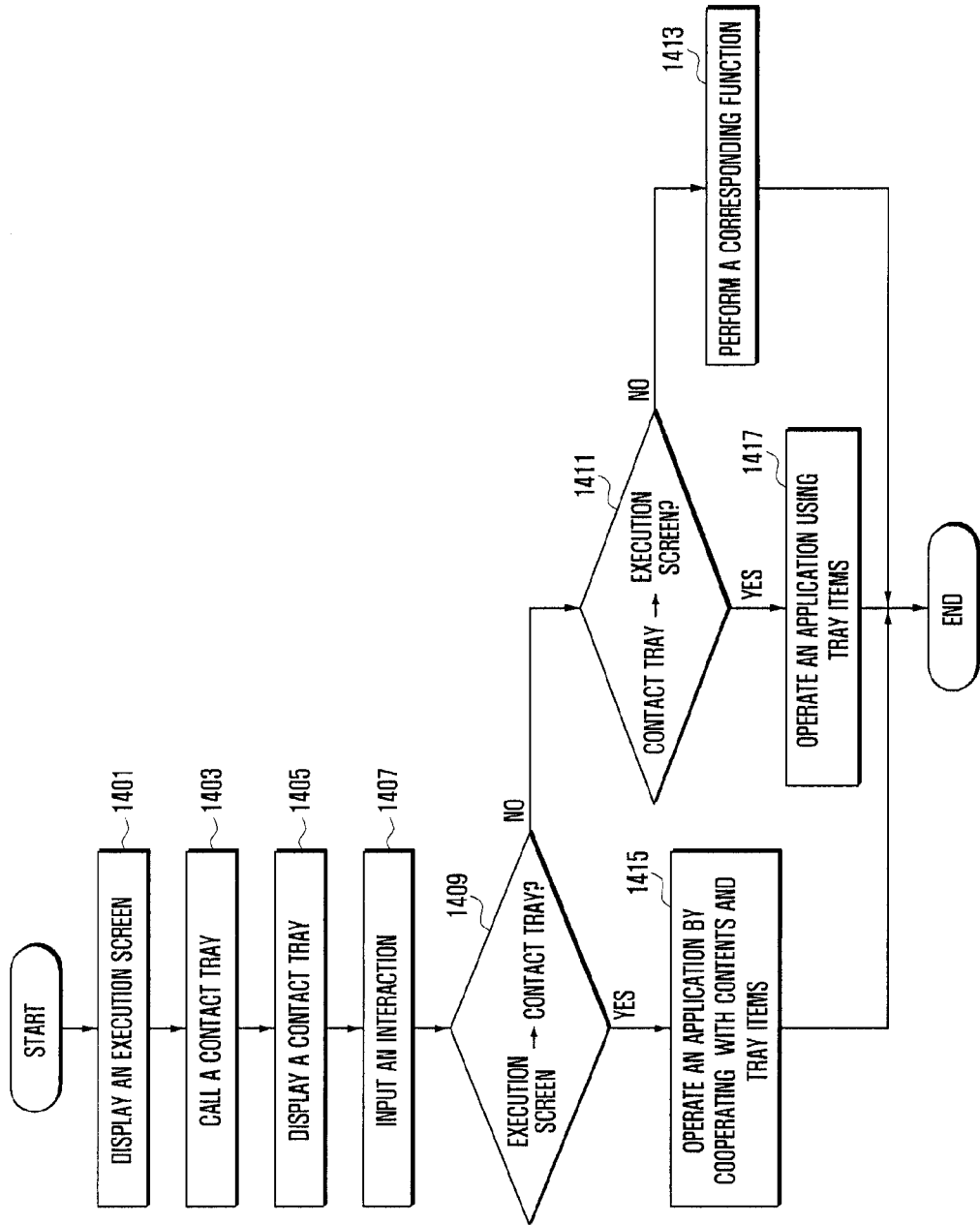
FIG. 14 illustrates a flow chart that describes a method for operating applications using tray items cooperated with contact information according to an embodiment of the invention.

FIG. 14 illustrates a flow chart that describes a method operable in the controller 140 for operating applications using tray items with contact information in a touch device according to an embodiment of the invention.

Referring to FIG. 14, the controller 140 operates a particular mode and accordingly displays an execution screen (1401). For example, the controller 140 may display an idle screen according to the operation in an idle mode and an execution screen according to the execution of an application on the display unit 120.

The controller 140 senses an interaction for calling a contact tray 400 in an execution screen (1403). For example, when the user inputs a tap interaction in the tray indicator region 250, the display unit 120 creates an input signal for the tap interaction and transfers it to the controller 140. The controller 140 detects the calling of the contact tray 400 according to the received input signal.

When the call interaction is input to the tray indicator region 250, the controller 140 displays the contact tray 400 at one side on the execution screen (1405). The controller 140 checks whether a communication event had occurred when providing the contact tray 400. As described in the section referring to FIG. 13, the controller 140 applies an effect to a corresponding tray item and provides it to the contact tray 400. Alternatively, the controller 140 automatically performs a scrolling operation to show a corresponding tray item and applies an effect to the tray item.

After that, the controller 140 senses an interaction input to the contact tray 400 or the execution screen (1407). For example, as described in the sections referring to FIGS. 5 to 12, the controller 140 can sense an interaction for scrolling a tray item in the contact tray 400, an interaction moving from the execution screen to the contact tray 400, or an interaction moving from the contact tray 400 to the execution screen.

The controller 140 senses the input interaction and identifies a type of input interaction. That is, the controller 140 analyzes whether the input interaction is to operate an application that associates a tray item of the contact tray 400 with content of the execution screen. When the input interaction is to operate an application, the controller 140 determines whether the input interaction moves from the execution screen to a particular tray item in the contact tray 400 (1409). When the controller 140 ascertains that the input interaction does not move from the execution screen to a particular tray item in the contact tray 400 at step 1409, it further determines whether the input interaction moves from a particular tray item in the contact tray 400 to the execution screen (1411).

When the controller ascertains that the input interaction does not move from a particular tray item in the contact tray 400 to the execution screen at step 1411, i.e., the input interaction is not to execute an application, it controls a corresponding function (1413). For example, as described in the section referring to FIG. 5, the controller 140 scrolls the tray items in the second item region 450 of the contact tray 400, according to the input interaction. In addition, as described in the section referring to FIG. 6, the controller 140 displays a pop-up window 500 for a selected tray item in the contact tray 400, according to the input interaction.

However, when the controller 140 ascertains that the input interaction moves from the execution screen to a particular tray item in the contact tray 400 at step 1409, it operates an application by associating content in the execution screen, selected according to the input interaction, with contact information about a tray item at a position where the input interaction is moved and located, and then configures an execution screen according to the operation of the application (1415). This process will be described in detail referring to FIG. 15.

Meanwhile, when the controller ascertains that the input interaction moves from a particular tray item in the contact tray 400 to a certain area in the execution screen at step 1411, it operates an application based on contact information about a tray item selected by the input interaction, and configures an execution screen according to the operation of the application (1417). This process will be described in detail referring to FIG. 16.

Figure 15:
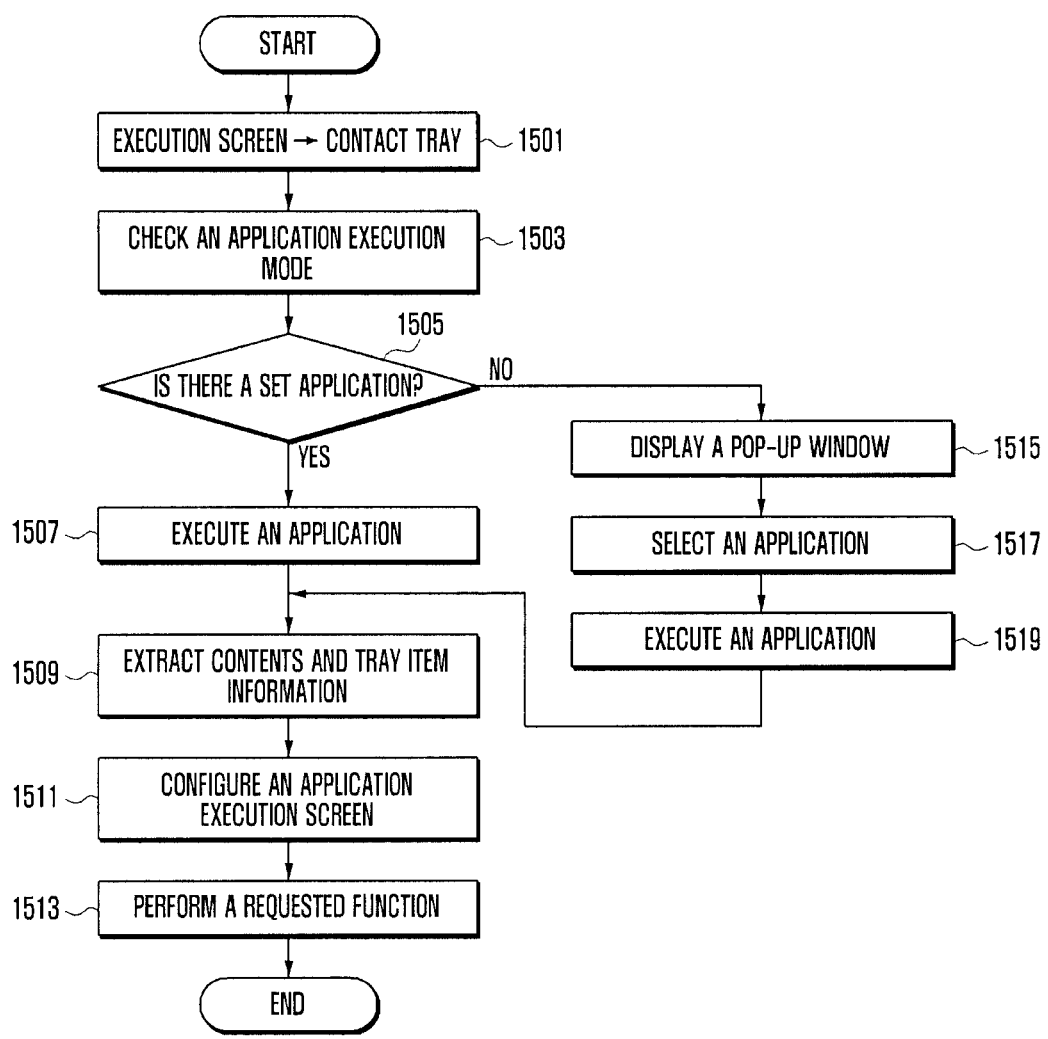
FIG. 15 and FIG. 16 illustrate flow charts that describe processes for operating applications based on contact information of tray items, according to an embodiment of the invention.

FIG. 15 illustrates a flow chart that describes a process 1415 for operating an application based on contact information of a tray item, shown in the flow chart of FIG. 14.

Referring to FIG. 15, the controller 140 ascertains that the input interaction moves from the execution screen to a particular tray item in the contact tray 400 (1501), and checks an application execution mode (1503). For example, the controller 140 determines whether an application is set to be executed according to the interaction input as step 1501 (1505).

When the controller 140 ascertains that there is an application to be executed according to the interaction at step 1505, it executes the set application (1507). When executing the application, the controller 140 extracts contact information, corresponding to a tray item, and content (or information corresponding to content), and determines a combination thereof (1509).

After that, the controller 140 configures and displays an execution screen for the executed application, according to the combination (1511). For example, as described in the sections referring to FIGS. 8 to 10, the controller 140 can configure an execution screen in such a way to set a recipient section (area) automatically based on contact information about a tray item and to set a body section (area—automatically based on content (or information about content).

After configuring the execution screen for the executed application at step 1511, the controller 140 controls a requested operation (1513). For example, the controller 140 can control functions according to the execution of the application, as the recipient is set based on contact information about a tray item and a body is set to include the content (or information about content). Examples of the functions are email transmission, message transmission, Facebook registration, Twitter registration, etc.

However, when the controller 140 ascertains that there is not an application to be executed according to the interaction at step 1505, the controller 140 displays executable applications via a pop-up window (1515). For example, as described in the section referring to FIG. 7, the controller 140 displays a number of executable applications via a pop-up window 700.

After that, the controller 140 senses an interaction that selects a particular application presented on the pop-up window (1517). The controller 140 executes the selected application (1519), and then returns to step 1509.

Figure 16:
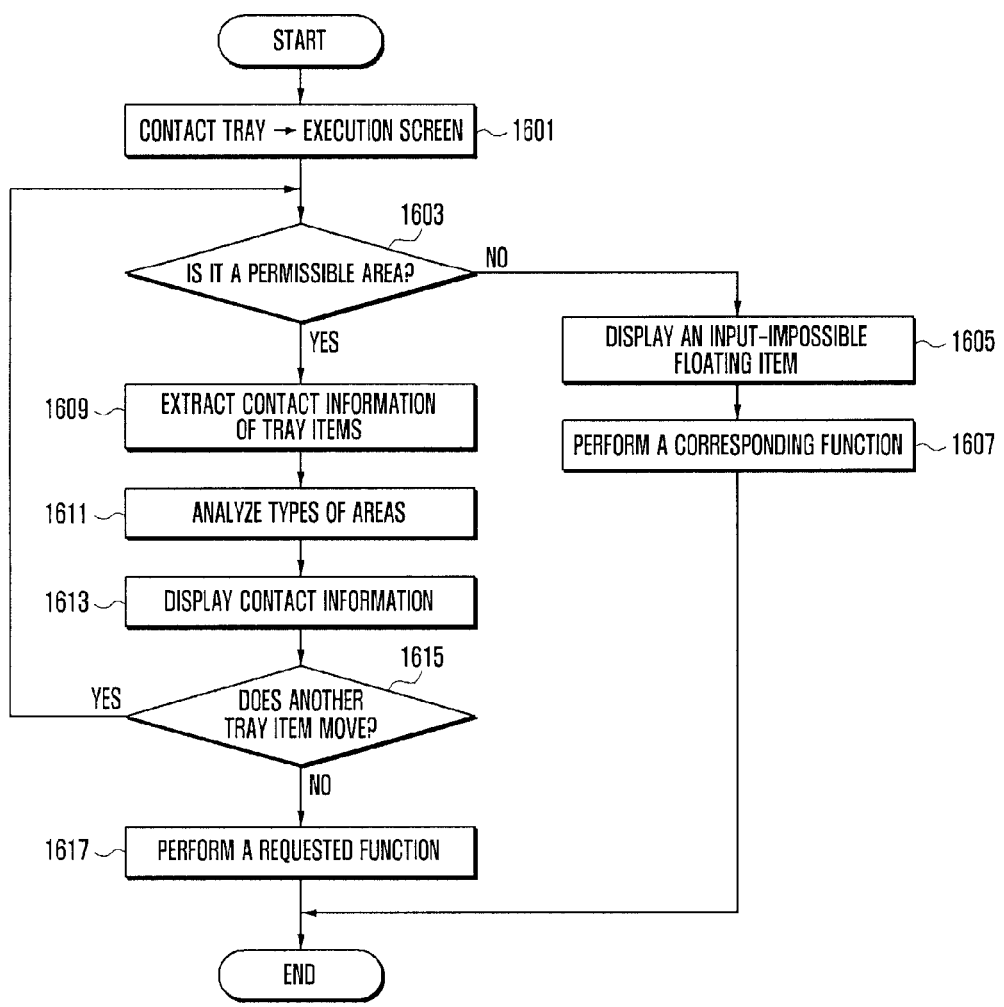

FIG. 16 illustrates a flow chart that describes a process 1417 for operating an application based on contact information of a tray item, shown in the flow chart of FIG. 14.

Referring to FIG. 16, the controller 140 senses the input interaction that moves from a particular tray item in the contact tray 400 to a certain area in the execution screen (1601). The controller 140 determines whether the area where the interaction is located is a permissible area that can receive a contact information-based input (1603).

When the controller 140 ascertains that the area where the interaction is located is an impermissible area that cannot receive a contact information-based input at step 1603, the controller 140 displays the tray item via a floating item indicating that contact information cannot be input, as described in the section referring to FIG. 12, (1605). After that, the controller 140 performs a corresponding operation (1607). For example, as described in the section referring to FIG. 12, when the interaction is moved to a permissible area where contact information can be input, the controller 140 switches the floating item of the tray item to a floating item indicating that contact information can be input. After that, the controller 140 proceeds with step 1609 and performs the following steps thereof.

However, when the controller 140 ascertains that the area where the interaction is located is a permissible area that can receive a contact information-based input at step 1603, the controller 140 extracts contact information corresponding to the tray item (1609). The controller 140 analyzes the type of area to which the interaction is input (1611). For example, as described in the section referring to FIG. 11, the controller 140 can analyzes the type of area to which the tray item is moved according to the interaction. In another embodiment of the invention, it can be implemented in such away that step 1609 follows step 1611 (i.e., step 1611 is processed and then step 1609 is done).

After that the controller 140 inputs the extracted contact information corresponding to the analyzed type of area the extracted contact information is displayed on the display unit, (1613). For example, as described in the section referring to FIG. 11, the controller 140 can configure a corresponding area in the execution screen, based on the contact information corresponding to the tray item.

The controller 140 determines whether another tray item is additionally moved (1615). When the controller 140 ascertains that another tray item is moved at step 1615, processing returns to and proceeds with step 1603.

However, when the controller 140 ascertains that another tray item is not moved at step 1615, the controller 140 configures an execution screen for the executed application and controls a requested operation (1617). For example, the controller 140 performs functions of the application on the execution screen that has been configured based on the contact information about the tray item. Examples of the functions are email transmission, message transmission, Facebook registration, Twitter registration, etc.

As described above, the touch device controlling method using tray items associated with contact information, according to the invention, can be implemented with program commands that can be conducted in various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary skilled person in the art, which when loaded into a computer or processor instructs the computer or processor to execute the processing shown herein.

The computer-readable recoding media includes hardware systems for storing and conducting program commands. Examples of the hardware systems are magnetic media such as a hard disk, floppy disk, a magnetic tape, optical media such as CD-ROM and DVD, Magneto-Optical Media, such as an optical disk, ROM, RAM, flash memory, etc. The program commands include assembly language or machine code complied by a compiler and a higher level language interpreted by an interpreter. The hardware systems may be implemented with at least one software module to comply with the invention.

As described above, the touch device and the touch device operating method, according to the invention, can allow for an easy access to functions and applications that require contact information, in a touch device with a touch-based input interface, via tray items cooperated with the contact information. The touch device operating method can be applied to all types of devices with a touch-based input interface.

In addition, the touch device and the touch device operating method, according to the invention, can support a contact tray containing contact information-based tray items on all screens executed in the touch device. The touch device and the touch device operating method can provide a user interface environment where various applications and function, requiring contact information, can be easily and intuitively operated via tray items of a contact tray. Furthermore, the touch device and the touch device operating method can execute an application in cooperation with contact information to implement an environment where the application can be intuitively and effectively operated, thereby enhancing their use, convenience, and competitiveness.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A method, operable in a processor, for operating applications of a touch device, comprising:
    displaying, on an execution screen, a contact tray comprised of a number of tray items including contact information;
    receiving an interaction that selects a tray item in the contact tray and moves the selected tray item to an area of the execution screen corresponding to an application;
    configuring the execution screen displaying content for an application by associating the content with a contact information of the tray item selected by the interaction; and
    operating the application based on the configured execution screen.

2. The method of claim 1, wherein displaying a contact tray comprises:
    receiving an interaction for calling the contact tray via a tray indicator region in a state information display area; and
    overlaying and displaying a list of contacts on the execution screen, according to the call interaction.

3. The method of claim 1, wherein receiving an interaction comprises:
    sensing an interaction input to the execution screen or the contact tray; and
    identifying the type of sensed interaction.

4. The method of claim 3, further comprising:
    scrolling, when the interaction is input to the contact tray, a number of tray items in the contact tray, according to the interaction.

5. The method of claim 4, wherein scrolling a number of tray items comprises:
    fixedly displaying part of the number of tray items in a fixed region on the contact tray; and
    scrolling the other tray items in scrolling region on the contact tray.

6. The method of claim 3, further comprising:
    displaying, when the interaction is input to the contact tray, contact information about a tray item, selected by the input interaction, via a pop-up window.

7. The method of claim 3, wherein configuring an execution screen comprises:
    receiving an interaction that selects content in the execution screen and moves it to a tray item in the contact tray; and
    configuring an execution screen for an application by associating the content, selected by the interaction, with contact information about the tray item where the interaction is moved and located.

8. The method of claim 7, wherein configuring an execution screen comprises:
    determining whether there is an application to be executed according to the input interaction;
    executing, when there is an application to be executed, the application;
    determining, when the application is executed, a combination of contact information corresponding to the tray item with the content; and
    configuring an execution screen for the application, according to the combination.

9. The method of claim 8, wherein configuring an execution screen comprises:
    setting a recipient based on contact information corresponding to the tray item; and
    configuring a body based on the content.

10. The method of claim 8, further comprising:
    displaying, when there is not an application to be executed, executable applications via a pop-up window.

11. The method of claim 3, wherein configuring an execution screen comprises:
    receiving an interaction that selects a tray item in the contact tray and moves the selected tray item to the execution screen; and configuring an execution screen for an application, based on contact information corresponding to the selected tray item.

12. The method of claim 11, wherein configuring an execution screen comprises:
    extracting contact information corresponding to the tray item;
    analyzing a type of area to which the interaction is input; and
    inputting and displaying the extracted contact information, according to the type of area.

13. The method of claim 12, further comprising:
    determining whether an area in the execution screen to which the interaction is located is a permissible area where a contact information-based input is input; and
    displaying a floating item corresponding to the tray item via a floating item indicating that the contact information is prevented from being input, when the determined area is a non-permissible area.

14. The method of claim 13, further comprising:
    displaying a floating item corresponding to the tray item via a floating item indicating that the contact information can be input, when the interaction is moved from the impermissible area to the permissible area.

15. A touch device comprising:
    a display unit for:
        displaying an execution screen for an application and a contact tray comprised of contact information-based tray items on the execution screen, and
        receiving an interaction that selects one of the tray items in the contact tray and moves the selected tray item to a content of the execution screen; and
    a controller for:
        configuring the execution screen for an application by associating the content with a contact information of the tray item selected by the interaction, and
        operating the application based on the configured execution screen.

16. The touch device of claim 15, wherein the contact tray comprises:
    a first item region containing a tray item associated with contact information corresponding to a user of the touch device; and
    a second item region containing a number tray items associated with contact information registered by the user.

17. The touch device of claim 16, wherein:
    the first item region is a fixed region where tray items are not scrollable; and
    the second item region is a scroll region where tray items are scrolled according to the interaction.

18. The touch device of claim 16, wherein the contact tray further comprises:
    a third item region containing items for editing tray items.

19. The touch device of claim 15, wherein the controller: senses an interaction that selects content in the execution screen and moves it to a tray item in the contact tray; and configures an execution screen for an application by associating the content, selected by the interaction, with contact information about the tray item where the interaction is moved and located.

20. The touch device of claim 15, wherein the controller: senses an interaction that selects a tray item in the contact tray and moves it to the execution screen; and
    configures an execution screen for an application, based on contact information about the tray item selected by the interaction.

* * * * *